US009618329B2

(12) United States Patent
Weston et al.

(10) Patent No.: US 9,618,329 B2
(45) Date of Patent: Apr. 11, 2017

(54) OPTICAL INSPECTION PROBE

(75) Inventors: Nicholas John Weston, Peebles (GB); Alexander David McKendrick, East Kilbride (GB)

(73) Assignee: RENISHAW PLC, Wotton-under-Edge (GB)

( * ) Notice: Subject to any disclaimer, the term of this patent is extended or adjusted under 35 U.S.C. 154(b) by 316 days.

(21) Appl. No.: 12/990,846

(22) PCT Filed: May 19, 2009

(86) PCT No.: PCT/GB2009/001260
§ 371 (c)(1),
(2), (4) Date: Nov. 3, 2010

(87) PCT Pub. No.: WO2009/141606
PCT Pub. Date: Nov. 26, 2009

(65) Prior Publication Data
US 2011/0058159 A1 Mar. 10, 2011

(30) Foreign Application Priority Data

May 19, 2008 (GB) .................................. 0809037.5

(51) Int. Cl.
*G01B 11/00* (2006.01)
*G01B 11/24* (2006.01)
(52) U.S. Cl.
CPC ............ *G01B 11/007* (2013.01); *G01B 11/24* (2013.01)
(58) Field of Classification Search
CPC .. G01B 11/002–11/007; G01B 11/022–11/024
USPC .......................................... 356/241.1, 237.1
See application file for complete search history.

(56) References Cited

U.S. PATENT DOCUMENTS

| 3,442,567 | A | * | 5/1969 | Hansen ......................... 359/503 |
| 3,816,649 | A | * | 6/1974 | Butters et al. ................ 348/161 |
| 4,264,161 | A | * | 4/1981 | Hosoe et al. .................. 396/153 |
| 4,306,783 | A | * | 12/1981 | Murray ......................... 353/121 |
| 4,585,349 | A | * | 4/1986 | Gross ..................... G01B 11/00 356/624 |
| 4,633,074 | A | * | 12/1986 | Kunz .......................... 250/201.2 |
| 4,861,984 | A | * | 8/1989 | West ............................. 250/236 |

(Continued)

FOREIGN PATENT DOCUMENTS

DE 103 01 094 A1 7/2004
EP 0 690 286 A1 1/1996

(Continued)

OTHER PUBLICATIONS

Mitutoyo, "Vision Measuring Systems, Precision and quality in sharp focus—Quick Scope and Quick Vision," 24 pages; downloaded May 20, 2009.

(Continued)

*Primary Examiner* — Kara E Geisel
*Assistant Examiner* — Shawn Decenzo
(74) *Attorney, Agent, or Firm* — Oliff PLC

(57) ABSTRACT

An optical inspection probe for obtaining and providing images of an object to be inspected. The optical inspection probe comprises an imaging assembly for capturing an image of an object and an illumination assembly for producing a light beam directed toward the object. The optical inspection probe is configured such that the light beam converges to a focal point at a first focal plane.

33 Claims, 17 Drawing Sheets

(56) References Cited

U.S. PATENT DOCUMENTS

| | | | | |
|---|---|---|---|---|
| 4,904,063 A | * | 2/1990 | Okada et al. | 349/200 |
| 5,054,087 A | * | 10/1991 | Carbon et al. | 382/152 |
| 5,155,370 A | * | 10/1992 | Osawa et al. | 250/548 |
| 5,301,012 A | * | 4/1994 | King et al. | 356/398 |
| 5,365,597 A | * | 11/1994 | Holeva | 382/318 |
| 5,615,489 A | * | 4/1997 | Breyer et al. | 33/503 |
| 5,883,803 A | * | 3/1999 | Vann | 700/59 |
| 5,914,784 A | * | 6/1999 | Ausschnitt et al. | 356/624 |
| 5,982,491 A | | 11/1999 | Breyer et al. | |
| 6,007,255 A | * | 12/1999 | Krauter | G02B 6/4298 |
| | | | | 362/551 |
| 6,011,255 A | | 1/2000 | Rueb et al. | |
| 6,303,903 B1 | * | 10/2001 | Liu | B23K 26/04 |
| | | | | 219/121.6 |
| 6,327,041 B1 | * | 12/2001 | Guern | G01B 11/24 |
| | | | | 250/559.22 |
| 6,407,387 B1 | * | 6/2002 | Frosien et al. | 250/310 |
| 6,546,126 B1 | | 4/2003 | Wittmann et al. | |
| 6,621,065 B1 | | 9/2003 | Fukumoto et al. | |
| 6,700,698 B1 | * | 3/2004 | Scott | 359/347 |
| 6,917,421 B1 | * | 7/2005 | Wihl | G01B 11/0608 |
| | | | | 356/237.5 |
| 7,016,525 B2 | * | 3/2006 | Gladnick | 382/141 |
| 7,508,529 B2 | | 3/2009 | Gladnick et al. | |
| 8,124,932 B2 | * | 2/2012 | Ogawa et al. | 250/306 |
| 8,555,282 B1 | | 10/2013 | Kahn et al. | |
| 2003/0011788 A1 | | 1/2003 | Hoche | |
| 2003/0233760 A1 | | 12/2003 | Lotze | |
| 2005/0046930 A1 | | 3/2005 | Olschewski | |
| 2005/0159842 A1 | | 7/2005 | Ban et al. | |
| 2005/0228256 A1 | | 10/2005 | Labadie et al. | |
| 2009/0118613 A1 | | 5/2009 | Krugman et al. | |
| 2009/0138233 A1 | | 5/2009 | Kludas et al. | |

FOREIGN PATENT DOCUMENTS

| | | |
|---|---|---|
| EP | 0 532 169 B1 | 3/1996 |
| EP | 0 877 225 A2 | 11/1998 |
| EP | 1 365 894 B1 | 7/2005 |
| EP | 1 580 691 A2 | 9/2005 |
| GB | 2 451 441 A | 2/2009 |
| JP | A-61-156215 | 7/1986 |
| JP | U-07-029657 | 6/1995 |
| JP | A-10-227738 | 8/1998 |
| JP | A-2001-141425 | 5/2001 |
| JP | A-2001-154098 | 6/2001 |
| JP | A-2001-296229 | 10/2001 |
| JP | A-2002-074362 | 3/2002 |
| JP | A-2002-511575 | 4/2002 |
| JP | A-2006-071873 | 3/2006 |
| JP | A-2006-220953 | 8/2006 |
| JP | A-2006-294124 | 10/2006 |
| JP | 2007-058199 A | 3/2007 |
| JP | A-2007-058199 | 3/2007 |
| JP | A-2008-032727 | 2/2008 |
| WO | WO 90/07097 A1 | 6/1990 |
| WO | WO 99/01014 A1 | 1/1999 |
| WO | WO 99/53271 A1 | 10/1999 |
| WO | WO 02/070211 A1 | 9/2002 |
| WO | WO 03/052694 A2 | 6/2003 |
| WO | WO 2007/126947 A2 | 11/2007 |
| WO | WO 2009/024758 A1 | 2/2009 |
| WO | WO 2009/141606 A8 | 11/2009 |

OTHER PUBLICATIONS

Mitutoyo, "CNC Vision Measuring System Quick Vision," Catalog No. E4371-363, 24 pages, downloaded May 20, 2009.

Optical Gaging Products Inc, "Telestar TTL Laser," 2 pages, downloaded May 20, 2009.

Written Opinion of the International Searching Authority in International Application No. PCT/GB2009/001260; dated Sep. 30, 2009.

International Search Report in International Application No. PCT/GB2009/001260; dated Sep. 30, 2009.

Feb. 16, 2012 Office Action issued in Chinese Patent Application No. 200980117889.9 (with Translation).

Aug. 1, 2013 Office Action issued in Chinese Patent Application No. 200980117889.9 (with translation).

Jan. 24, 2013 Office Action issued in Chinese Patent Application No. 200980117889.9; with English-language translation.

Feb. 12, 2013 Office Action issued in European Patent Application No. 09750084.7.

Apr. 14, 2014 Office Action issued in Chinese Patent Application No. 201080024969.2 (with translation).

Apr. 30, 2014 Office Action issued in European Patent Application No. 09750084.7.

Carl Zeiss, *The Revolution in Optical Metrology. Eagle Eye Navigator*, Industrial Metrology, Germany, 2002.

*3D Displacement Sensor, Laser Profiling System*. Cognex Vision DS1000 Series, 2013.

CMS 106 & CMS 108 Laser Line Scanners Brochure, Hexagon Metrology, Germany, Jul. 2011.

CMS 106/108 Laser Line Scanners White Paper, Hexagon Metrology, 2011.

*LC15Dx Laser Scanner*. Nikon Metrology, 2011.

*LC60Dx—LC50Cx Digital Line Scanners*. Nikon Metrology, 2013.

*ModelMaker MMDx—MMCx Digital Handheld Laser Scanners*. Nikon Metrology, 2011.

*XC65Dx (-LS) Digital Cross Scanners*. Nikon Metrology, 2011.

Dec. 17, 2013 Official Notice of Rejection issued in Japanese Patent Application No. 2012-513671 (with translation).

Koch, Klaus-P., "Image Processing in Coordinate Measuring Technology," VDIZ, Springer VDI Verlag, Germany, Apr. 1993, pp. 40-16 (with translation).

Arnauld, A., "Three-dimensional Measuring Machines (MMT): focusing on fragile parts," Mcsures Regulation Automatisme, CFE, France, May 1992, vol. 57, No. 645, pp. 64-66 (with translation).

International Search Report issued in International Application No. PCT/GB2010/001088 dated Sep. 24, 2010.

Written Opinion of the International Searching Authority issued in International Application No. PCT/GB2010/001088 dated Sep. 24, 2010.

Search Report issued in British Patent Application No. 0909635.5 dated Oct. 5, 2009.

U.S. Appl. No. 13/322,044, filed Nov. 22, 2011 in the name of McKendrick et al.

Computer generated English language translation of JP-A-2007-058199.

Computer generated English language translation of JP-A-2006-220953.

Computer generated English language translation of JP-U-07-029657.

Sep. 10, 2013 Official Notice of Rejection issued in Japanese Patent Application No. 2011-510042 (with translation).

Dec. 22, 2014 Office Action issued in Chinese Application No. 201080024969.2.

Partial English-language translation of JP2007-058199.

May 11, 2015 Office Action issued in Chinese Application No. 201080024969.2.

Apr. 9, 2015 Office Action issued in U.S. Appl. No. 13/322,044.

Nov. 19, 2015 Office Action issued in U.S. Appl. No. 13/322,044.

Nov. 3, 2016 Office Action Issued in U.S. Appl. No. 13/322,044.

\* cited by examiner

OPTICAL INSPECTION PROBE

The present invention relates to an optical inspection probe and a method of its use. In particular, the invention relates to a vision inspection probe for imaging inside narrow bores.

When manufacturing parts, such as those for use in the automotive or aeronautical industries, it is often desirable to determine that those parts have been manufactured to within desired tolerances.

Conventionally, the dimensions of features of a part are determined by mounting the part on a coordinate measuring machine and bringing a touch probe mounted on the coordinate measuring machine into contact with the features of interest. The coordinates are taken of different points around the feature, thereby enabling its dimensions, shape and orientation to be determined.

Use of a touch probe has several disadvantages. Measurement with a touch probe can be slow (for example it can take 15 hours to examine a turbine blisk) and access can be limited (for example into very narrow or small bores).

Sometimes it is desirable to avoid physical contact with a part where parts have delicate surface coatings or finishes, or where parts are flexible and move significantly under the forces of a contact probe. In this case non-contact probes, such as optical probes, may be used.

Known optical probes use collimated or diverging light beams to illuminate a surface of interest. Existing optical probes can suffer from poor accuracy, limited field of view, artefacts caused by specula reflections, as well as restrictions from weight or large size.

A first aspect of the present invention provides an optical inspection probe comprising: an imaging assembly for capturing an image of an object; and an illumintion assembly for producing a light beam directed toward the object and which converges to a focal point at a first focal plane.

It has been found that the provision of a converging beam can aid inspection of an object. This is particularly the case for features having restricted access, such as openings in an object. For example, the invention can be particularly useful when inspecting bores because it can avoid illuminating the surface into which the bore is made when attempting to obtain an image of the internal surfaces or bottom of the bore.

The illumination system may comprise a light-source for producing a light beam.

The imaging assembly may be arranged to detect light reflected from an object plane, or from the vicinity of an object plane, towards the optical inspection probe along an imaging optical axis. The imaging assembly may comprise a sensor and an imaging lens assembly comprising at least one imaging lens. Light may pass through the imaging lens assembly before reaching the sensor.

The light beam may be directed toward an object plane of the imaging assembly. In this case the light beam may converge to its focal point at or prior to intersection with the object plane.

The focal point of the light beam may be substantially coincident with the optical inspection probe's imaging optical axis.

The light beam may be directed from the optical inspection probe to the first focal plane along an illumination optical axis. The illumination optical axis may be substantially coincident with the optical inspection probe's imaging optical axis.

Perspective distortion is typically at a minimum along the optical inspection probe's imaging optical axis; therefore any measurement data obtained from an image detected along the optical inspection probe's imaging optical axis can be more accurate than data obtained from an image detected off the optical inspection probe's imaging optical axis. It can be advantageous therefore to illuminate along the optical inspection probe's imaging optical axis such that the area which provides the most accurate measurement data can be clearly imaged.

At least one optical element, including for example a first lens, may be arranged in the path of the light beam to direct said light beam to its focal point at the first focal plane.

The at least one optical element for directing the light beam to its focal point at the first focal plane may be comprised in the imaging lens assembly. That is, the imaging lens assembly can also be configured to direct the light beam to its focal point. In this case the illumination assembly and imaging assembly can have at least one common optical element.

The present invention is particularly concerned with the type of optical inspection probes that obtain, and can supply to a third party system (such as an image processor and/or end user) images of an object to be inspected, so that feature recognition techniques can be used during image processing so as to obtain metrology data regarding the object. Such optical inspection probes are typically referred to as video inspection probes, or camera inspection probes, and herein collectively referred to as vision inspection probes. This is in contrast to known non-contact inspection probes that project a structured light beam (such as a line) onto the object and analyse the deformation of the structured light by the object to obtain measurement information.

The optical inspection probe may further comprise an housing having a window. In this case the at least one optical element, such as the first lens, can be arranged to direct the light beam through the window to the first focal plane. The first focal plane is preferably outside of the housing. Said housing may prevent ambient light from reaching the sensor of the imaging assembly and obscuring the detected image.

The light-source may be, for example, a light emitting diode (LED) or a Laser. Other known light sources may be used.

The imaging lens assembly may be interchangeable with other lens assemblies. For example, at least two lenses of different sizes may be provided, the at least two lenses being interchangeable.

The ability to change lenses may be useful, for example, where a part to be imaged has multiple surfaces which require different image sizes/resolutions and/or have restricted access by the probe. Accordingly, it can be advantageous for the optical inspection probe to be able to inspect the part with different fields of view/resolutions and working distances. This can be done using different lens assemblies with different optical properties.

Preferably the sensor comprises a two dimensional array of pixels, for example a charge coupled device (CCD) or a complementary metal oxide semiconductor (CMOS) arrays. Other known pixelated sensors may be used.

The sensor may comprise, for example, square, hexagonal, octagonal or triangular pixels. The sensor's pixel shape may be chosen depending on the shape of the feature to be inspected. For example, a sensor comprising triangular pixels may provide an image of a circular bore having a better resolution than an image of the same bore provided by a sensor comprising square pixels; therefore a sensor having triangular pixels may be chosen to provide an image of a circular bore.

Preferably the imaging assembly sends data to a processor in the form of an image.

The optical inspection probe may comprise a beam splitter arranged in the path of the light beam.

The beam splitter may be a non-polarising beam splitter. Preferably, the beam splitter is a polarising beam splitter. Where the beam splitter is a polarising beam splitter, a polarising filter may be located between the light-source and said polarised beam splitter; this may reduce spurious reflections of the light beam from the surfaces of the polarising beam splitter onto the sensor. Alternatively, a polarised light-source, such as a polarised laser, may be used in combination with a polarising beamsplitter.

Anti-reflection coatings may be used on the surfaces of the beam splitter and/or other optics in the optical inspection probe; this may reduce spurious reflections of the light beam from said surfaces/optics onto the sensor.

Alternatively, the plane faces of the beam splitter and/or other optical components can be arranged such that their normals are not aligned in such a way that the surfaces of said optical components reflect the light beam onto the sensor.

In use the first focal plane may be above the object plane. In this case the optical inspection probe is looking down onto a surface to be inspected. The optical inspection probe may alternatively be used in any other orientation such as, for example, for inspecting a vertical surface adjacent to the probe.

When the optical inspection probe is to be used to inspect a bore the minimum distance between first focal plane and the object plane is preferably half of the depth of the bore to be measured; if the distance is less than this, the marginal rays of the light beam may intersect the surface in which the bore is formed. When the optical inspection probe is to be used to inspect a plurality of bores, the minimum distance between first focal plane and the object plane is preferably half of the depth of the deepest bore to be measured.

The location of the focal point of the light beam may be adjustable relative to the optical inspection probe. The optical inspection probe may be configured such that the location of the focal point of the light beam is adjustable relative to the object plane. In particular, the location of the focal point of the light beam may be adjustable along the illumination optical axis.

Adjustment of the location of the focal point of the light beam may be achieved by, for example, adjusting the apparent or actual optical location of the light source. The illumination assembly may comprise a moveable light source such that the location of the focal point of the light beam is adjustable relative to the optical inspection probe.

The apparent optical location of the light source may be altered by using, for example, an optical element. At least one optical element, such as a lens, may be provided in the path of the light beam, said at least one optical element being moveable along the path of the light beam such that the location of the focal point of the light beam is adjustable relative to the optical inspection probe.

The optical inspection probe may comprise an adaptive optical element positioned in the path of the light beam, the optical properties of the adaptive optical element being alterable so as to change the location of the focal point of the light beam relative to the optical inspection probe. Such an adaptive optical element may be, for example, a liquid crystal lens, hydrostatic lens or deformable mirror. The location of the adaptive optical element may be fixed. Alternatively the adaptive optical element may be moveable.

The focal point of the illumination system, at its adjusted positions, may remain substantially coincident with the optical inspection probe's imaging optical axis.

The light beam, after converging at the focal point, diverges towards the object plane; the light beam therefore illuminates an area at the object plane. The illuminated area may be an area of interest on a surface to be inspected. The size of the illuminated area may be adjustable. This may be achieved by adjusting the divergence of the beam. Additionally, or alternatively, the position of the illuminated area may be adjustable. The angle of the illumination axis may be selectively adjustable. In this way the position of the illuminated area may be selectively adjustable.

The illumination assembly may be provided with at least one optical element for controlling the size of the beam. The light source of the optical inspection probe may itself comprise at least one optical element. The at least one optical element may alternatively be external to the light source. Preferably, such an external optical element may be located between the light source and the beam splitter. Alternatively the at least one optical element may be located between the lens assembly and the first focal plane. The optical at least one element may be located between the beam splitter and the imaging lens assembly. Alternatively, the at least one optical element may be located within the imaging lens.

Preferably the at least one optical element is an aperture. The aperture may be a single aperture of fixed size. The size of said aperture may be chosen to limit the width of the light beam at the object plane to suit the bore to be inspected. If there is a plurality of bores to be inspected it can be advantageous that the size of said aperture may be chosen to limit the width of the light beam at the object plane to suit the narrowest bore to be inspected. The aperture may be chosen to limit the diameter of the light beam to the width of the bore or slightly larger than the width of the bore.

The at least one optical element may provide a variety of beam sizes. In this case the at least one optical element may be a variable size optical element. The at least one optical element may be a variable shape optical element.

Where the optical element is an aperture the optical inspection probe may be provided with a variety of aperture sizes. The aperture may be a variable size aperture, such as, for example, an adjustable-iris aperture. An iris aperture may be securable at a discrete number of aperture sizes, or may be continuously adjustable. The aperture may be of variable size and shape, such as a light-valve aperture. Accordingly, preferably the optical inspection probe is configured such that the effective aperture size is effectively variable.

At least two interchangeable optical elements may be provided. For example, at least two apertures may be provided on a carousel.

The at least one optical element may be fixed. For example, the at least one optical element may be provided at a fixed location along the path of the light beam.

When the optical element is an aperture, for example, and the aperture is provided at a fixed location along the path of the light beam, changing the size of the aperture can result in a change in the area at the object plane that is illuminated by the light beam.

The at least one optical element may be moveable. The at least one optical element may be moveable along the length of the light beam. For example, the at least one optical element may be moveable along the length of the light beam; this movement may facilitate a change in the size of the illumination area at the object plane.

The at least one optical element may be moveable within the beam. Such movement may be rapid movement. In this case the illumination area at the object plane may be caused to move across the object plane. The position of the illumination area at the object plane can be adjusted by moving the at least one optical element, such as an aperture, within the beam such that a surface at the object plane can be scanned. The focal plane may also be adjusted in this way; the focal point may or may not move. Preferably the focal point remains substantially coincident with the optical inspection probe's imaging optical axis whilst the illumination area moves across the object plane.

The at least one optical element may be deformable within the beam such that the illumination area at the object plane may be caused to move across the object plane. The at least one optical element may alternatively be, for example, a tilting or translating lens or mirror. In any of these cases an aperture may additionally be provided.

The imaging assembly may comprise an objective lens and an object plane. Preferably, the imaging assembly has a depth of field of not more than $1/100^{th}$ of the distance between the objective lens and object plane. Preferably the imaging assembly has a depth of field of not less than $1;1000^{th}$ of the distance between the objective lens and object plane.

Preferably, the imaging assembly has a depth of field of not more than 5 mm, especially preferably not more than 3 mm. Preferably, the imaging assembly has a depth of field of not less than 20 µm, more preferably not less than 40 µm, for instance not less than 50 µm. The depth of field may be substantially evenly distributed on either side of an object plane of the imaging assembly. For instance, in the case of a 3 mm depth of field, the depth of field may be 1.5 mm either side of the object plane.

A second aspect of the present invention provides a coordinate measuring apparatus comprising an optical inspection apparatus.

A third aspect of the present invention provides a method of inspecting a feature of an object comprising: taking an optical inspection probe comprising an imaging assembly for capturing an image of the feature to be inspected and an illumination assembly for producing a light beam directed toward the feature and which converges at a focal point at a first focal plane; arranging the focal point of the beam such that the light beam converges at its focal point prior to falling on the feature; and obtaining at least one image of the feature of the object.

The feature can be an opening in the object, for instance a hole or a bore. The method can comprise arranging the focal point of the beam substantially at or prior to the mouth of the opening.

A fourth aspect of the present invention provides a method of inspecting a feature of a workpiece, using an optical inspection probe comprising an imaging assembly for capturing an image of an object and an illumination assembly for producing a light beam directed toward the object and which converges to a focal point at a first focal plane, the method comprising: (a) positioning the optical inspection apparatus relative to the workpiece; (b) illuminating the feature and detecting an image of the feature.

The method may comprise the additional step of determining the coordinate data for the image. The method may also comprise the step of performing image processing on the image to extract information describing the feature.

The optical inspection apparatus can be a vision probe.

Preferably information describing the feature comprises dimensional information.

The invention further provides an optical inspection probe comprising: a housing having a window; a light source for producing a light beam; a beam splitter arranged in the path of the light beam; a lens assembly arranged to direct light reflected by the beam splitter through the window to a focal plane outside the housing, which may be advantageously interchangeable with other lens assemblies; a detector arranged to detect light entering the window and passing through the lens and beamsplitter.

Furthermore, the invention provides a method of inspecting a feature of a workpiece, using an optical inspection probe which can be positioned relative to the workpiece in at least one linear and one angular degree of freedom, the method comprising: (a) positioning the optical inspection probe at multiple locations and/or orientations relative to the workpiece, to thereby take multiple images of the feature; (b) determining the coordinate data for the multiple images and combining the images to create a resultant image; and (c) performing image processing on the resultant image to extract information describing the feature.

The optical inspection probe can be a camera probe.

Preferably step (a) comprises projecting an area of light onto the surface of the feature and detecting an image of said projected area of light.

Preferably the multiple images of the feature are overlapping.

The inspection device may be positioned at multiple orientations and positions.

The coordinate data for the multiple images may be determined in two or three dimensions.

The image processing may comprise: determining the regions of a selection of images which are well focused by means of a filtering or similar algorithm; applying a camera distortion correction to the image; preparing a composite image in 2D or 3D comprising only those regions of a selection of images which are well focused. Known image processing technologies can be used to detect points on the feature of interest, for example comparing intensity values of the resultant image with a threshold and thereby determining a boundary.

In a preferred embodiment, the optical inspection probe is positioned to project a light beam onto an edge of the feature, such that the edge is in silhouette.

The invention further provides a method of extracting surface information from multiple images of sections of a feature of a workpiece, the images being taken at multiple known orientations, the method comprising:(a) determining the coordinate position of each pixel in the images in a reference frame; (b) optionally determining the regions of the images which are sharply focused; (c) combining the images within the reference frame to create a resultant image; (d) image processing the resultant image to extract information of the feature.

Preferably information of the feature comprises dimensional information.

The invention further provides apparatus for inspecting a feature of a workpiece, using an optical inspection probe which can be positioned relative to the workpiece in at least one linear and one angular degree of freedom, the apparatus comprising a controller for carrying out the following steps: (a) positioning the optical inspection device at multiple locations and/or orientations relative to the workpiece, to thereby take multiple images of the feature; (b) determining the coordinate data for the multiple images and combining the images to create a resultant image; and c) performing image processing on the resultant image to extract information describing the feature.

The invention further provides apparatus for extracting surface information from multiple images of sections of a feature of a workpiece, the images being taken at multiple known orientations, the apparatus comprising a controller for carrying out the following steps: (a) determining the coordinate position of each pixel in the images in a reference frame; (b) optionally determining the regions of the images which are sharply focused; (c) combining the images within the reference frame to create a resultant image; (d) image processing the resultant image to extract information of the feature.

Preferred embodiments of the invention will now be described with reference to the accompanying drawings in which.

Figure 1:
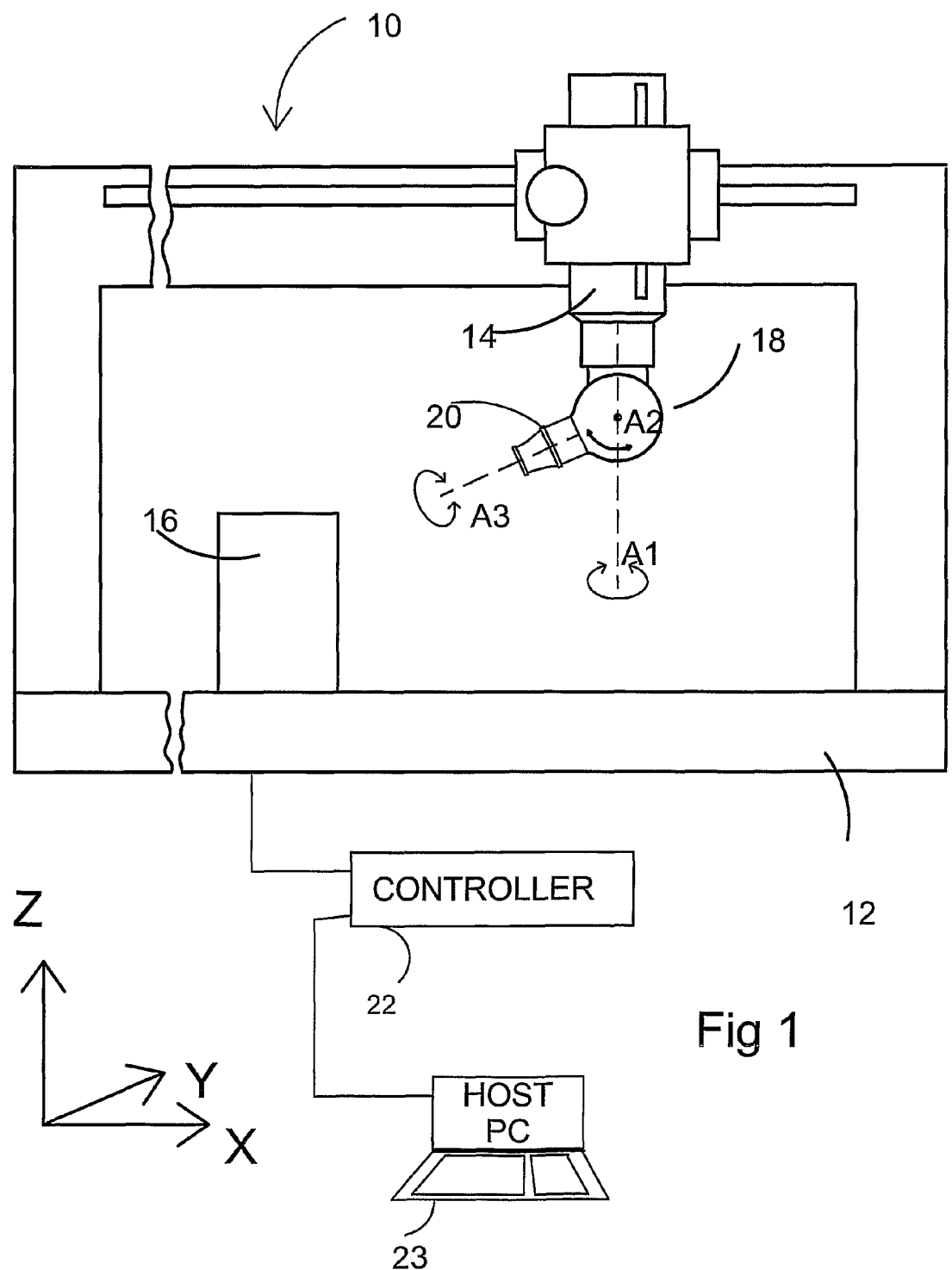
FIG. 1 illustrates a coordinate measuring machine with an articulating probe head and camera probe mounted thereon.
Figure 4A:
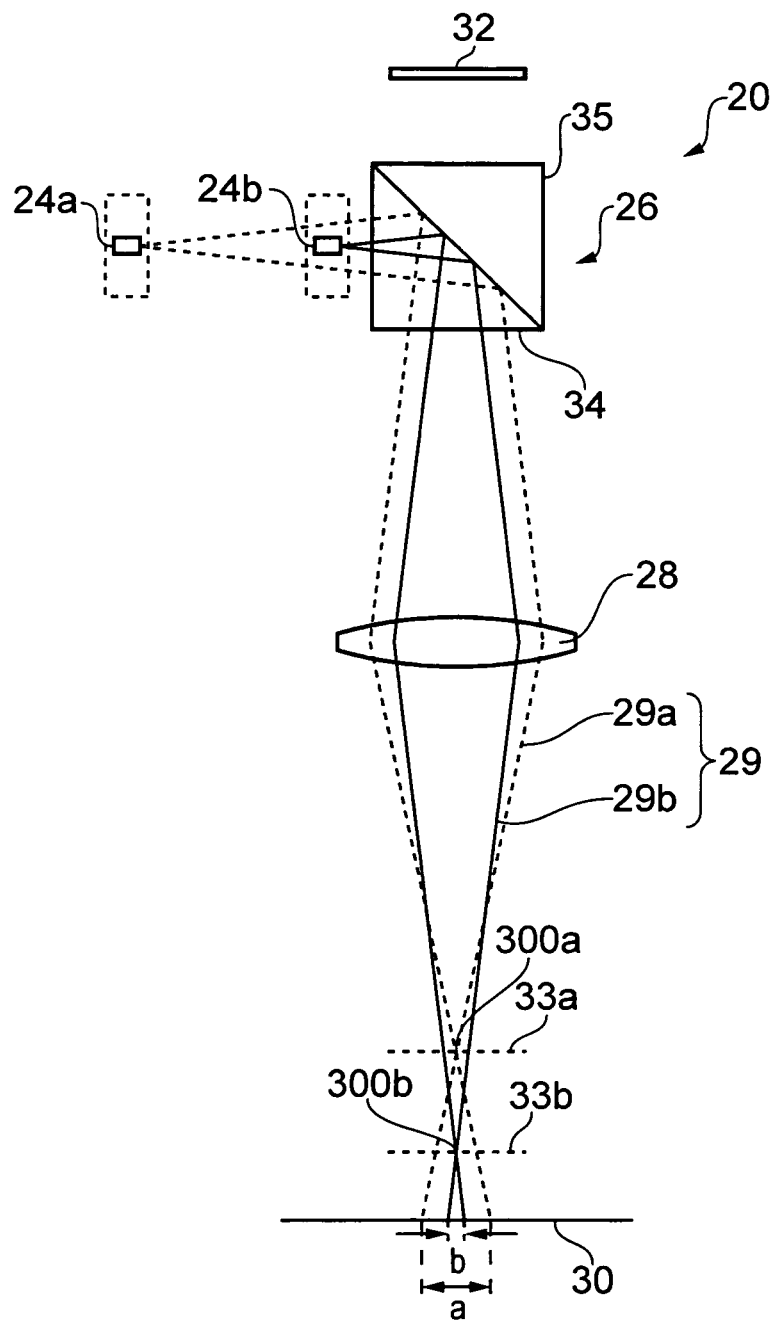
Figure 5:
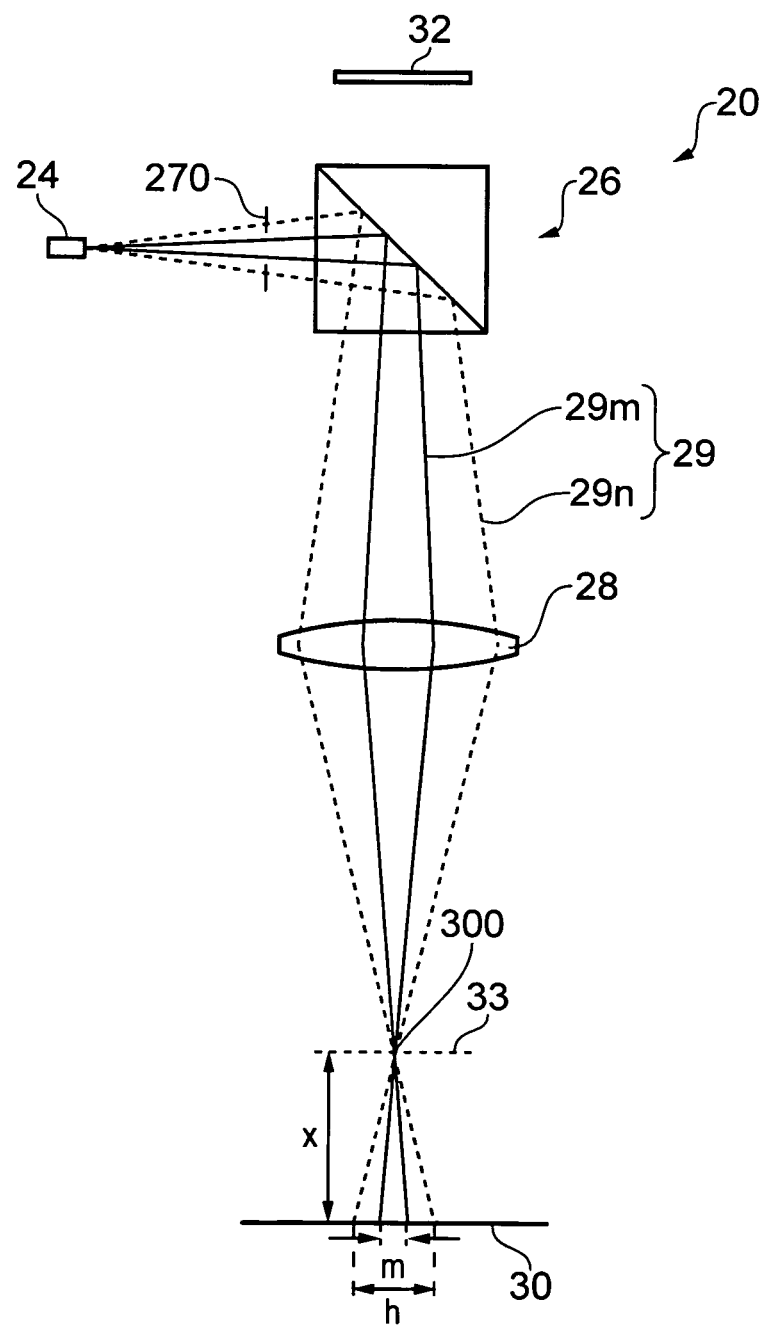
Figure 6A:
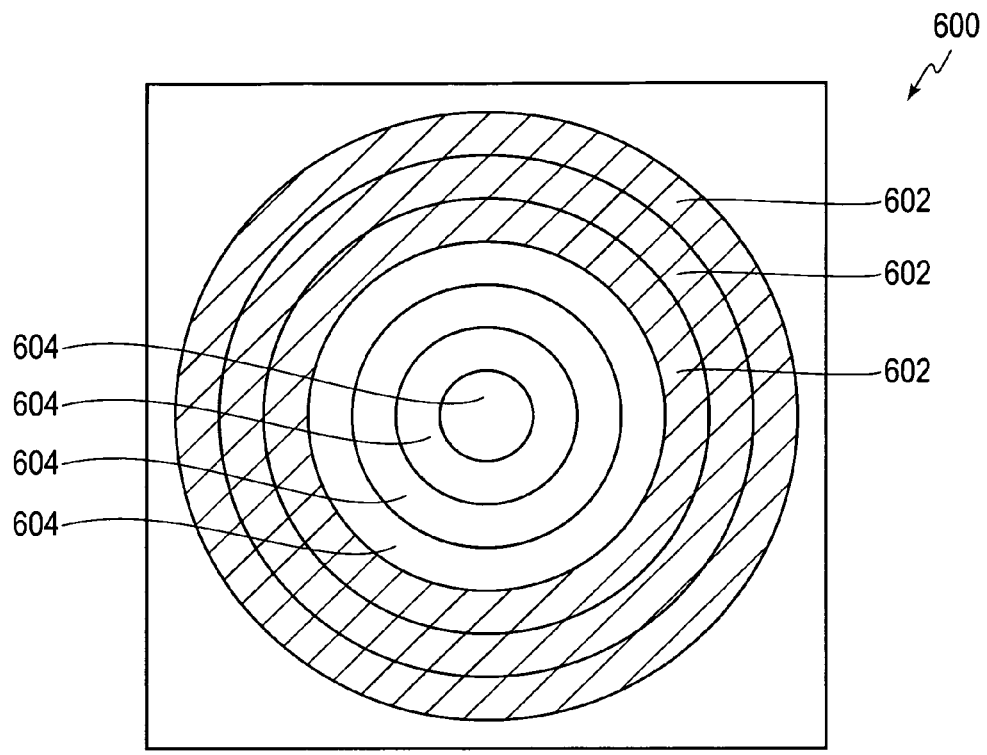
Figure 7:
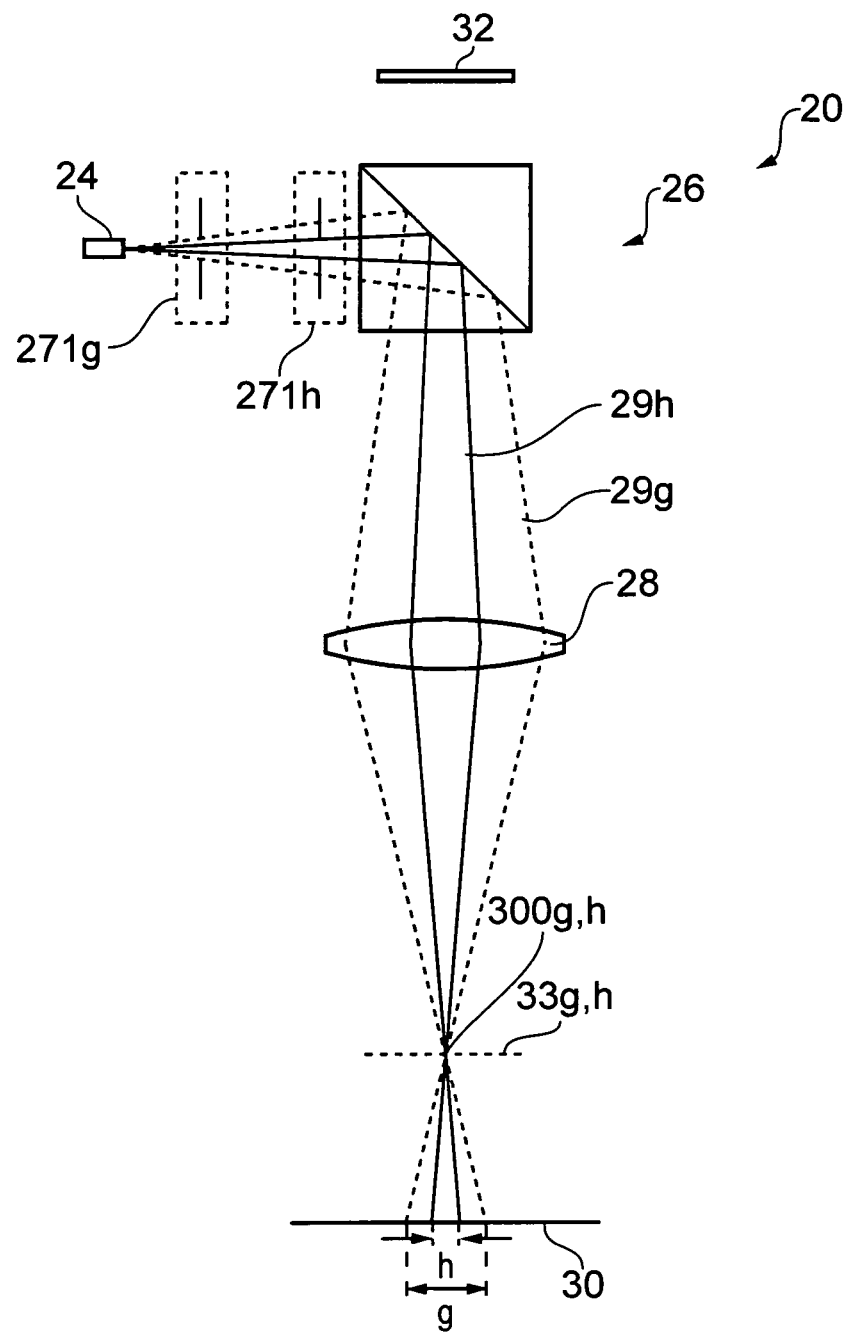
Figure 8:
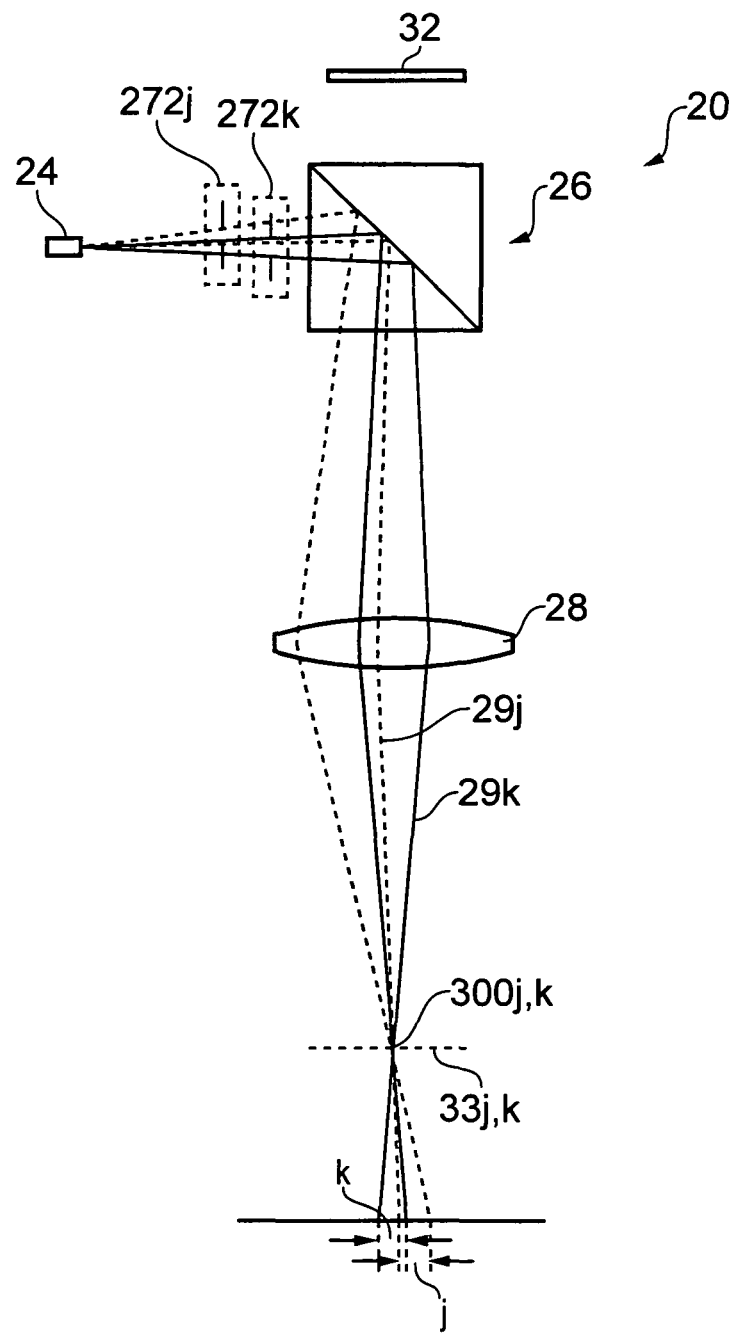
Figure 9A:
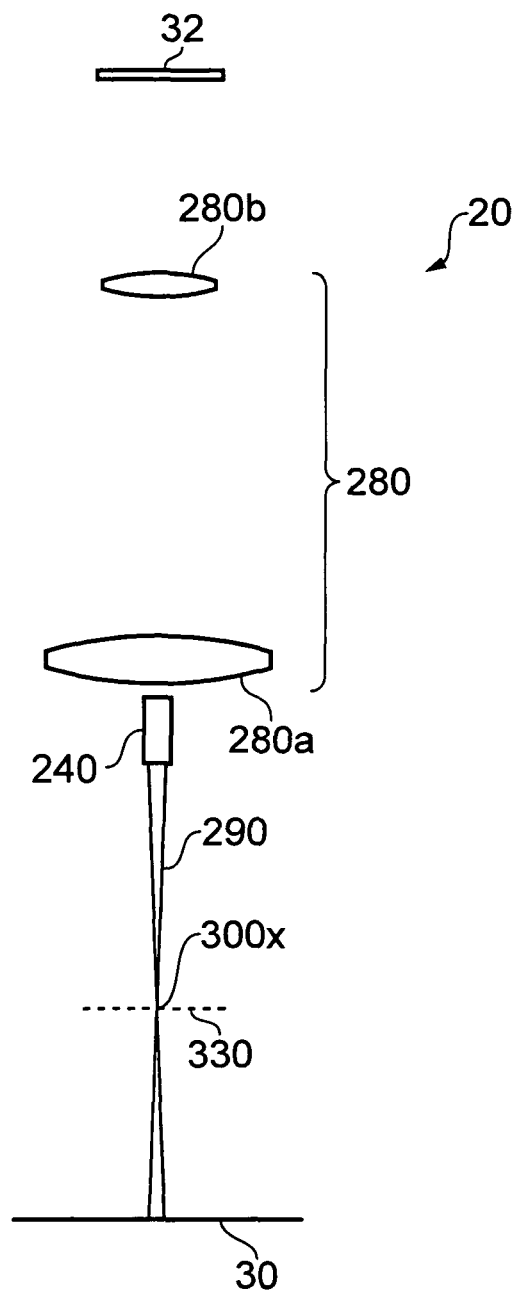
Figure 10:
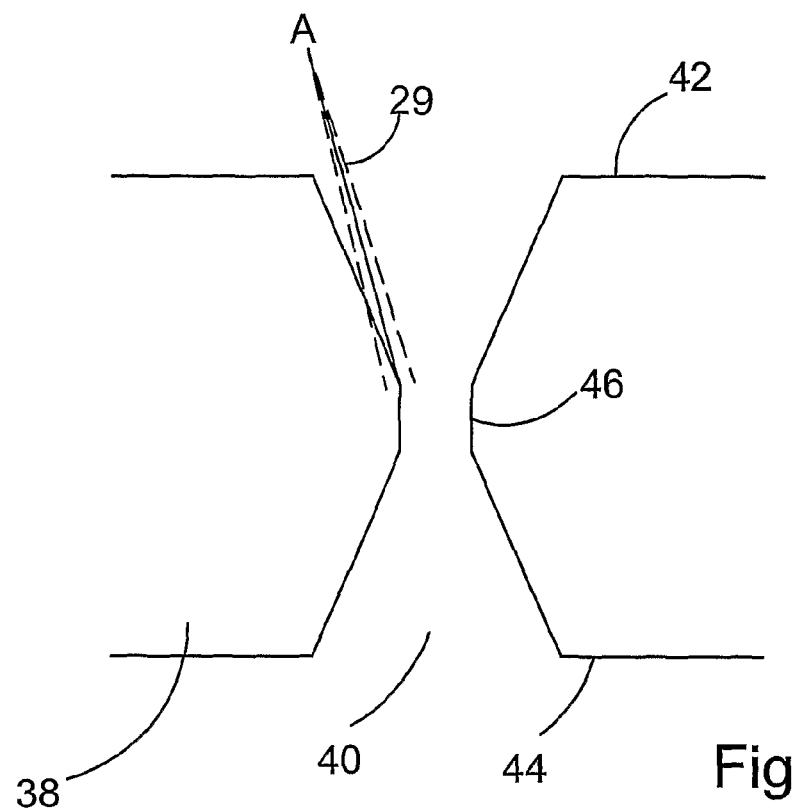
Figure 11:
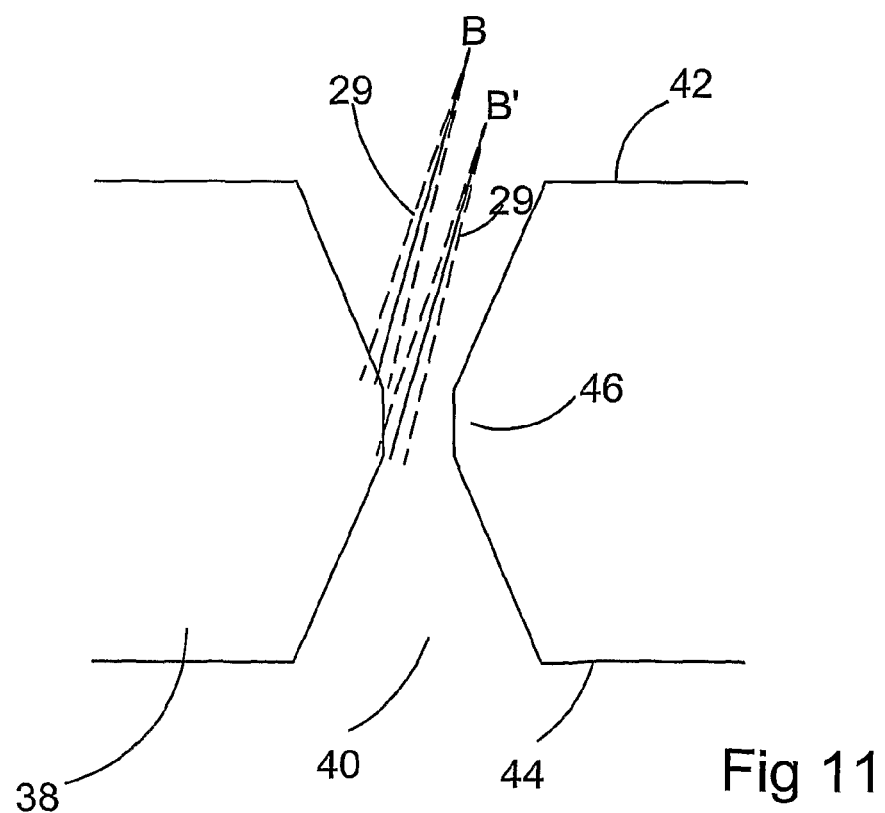
Figure 12:
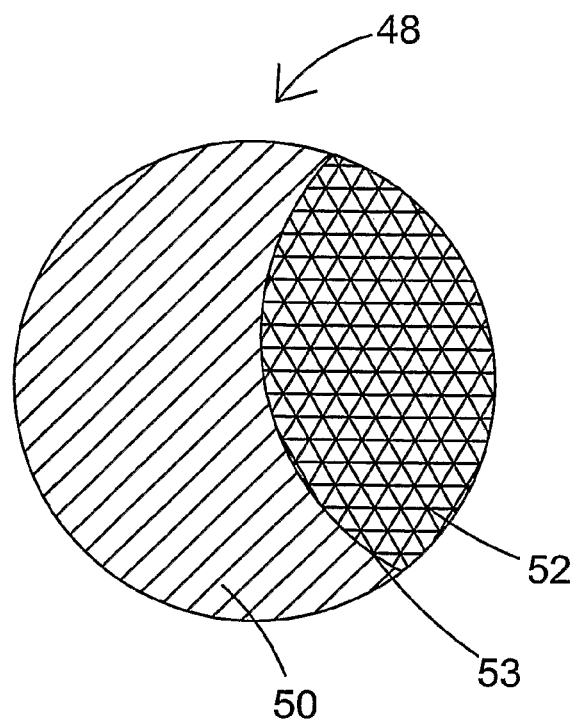
Figure 13:
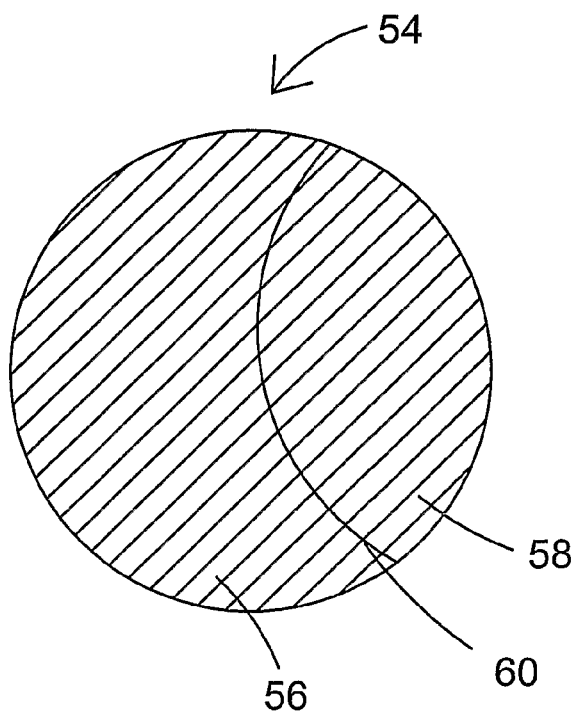
Figure 14:
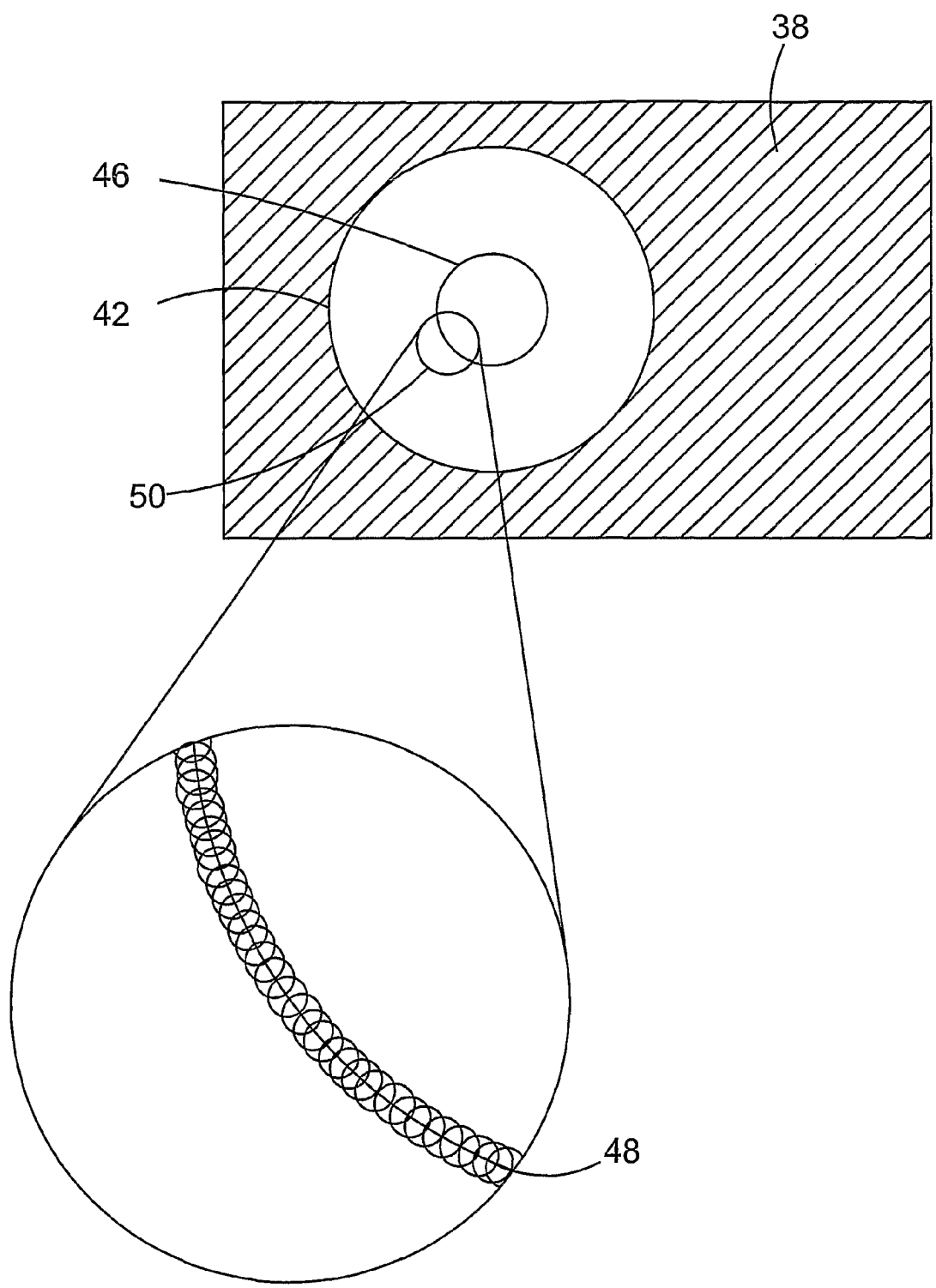
Figure 15A:
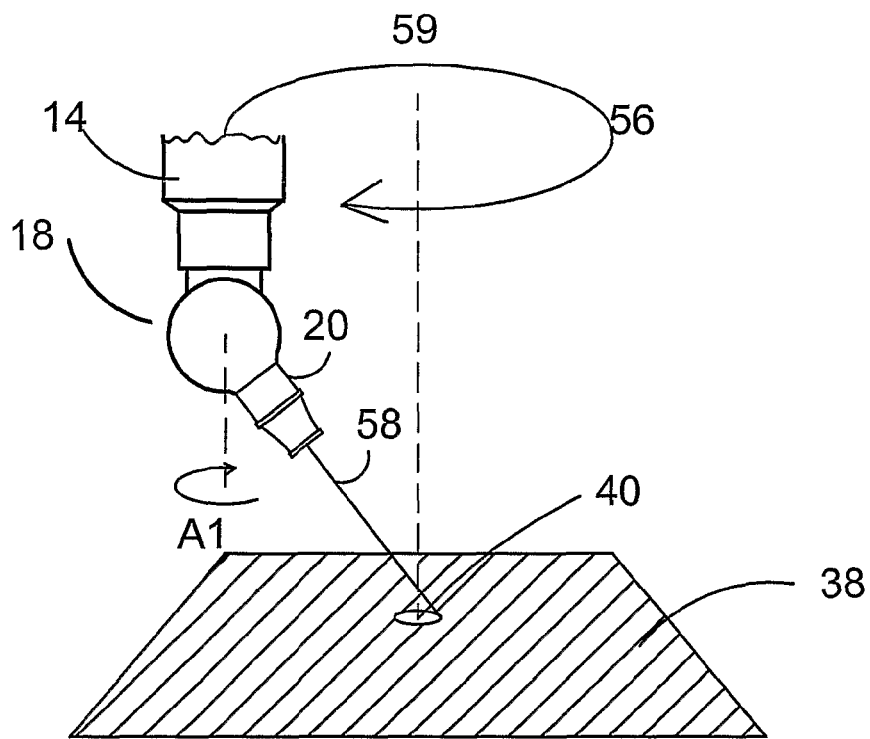
Figure 15B:
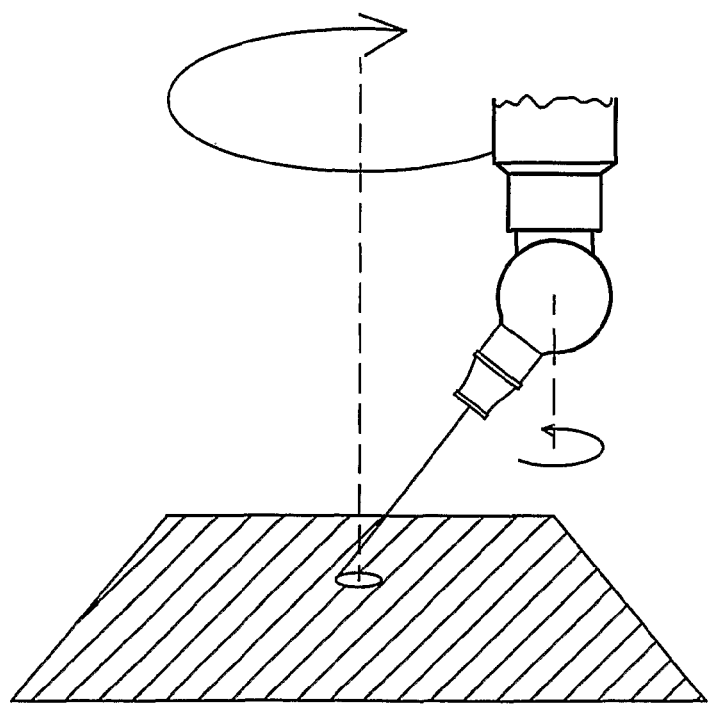
Figure 16:
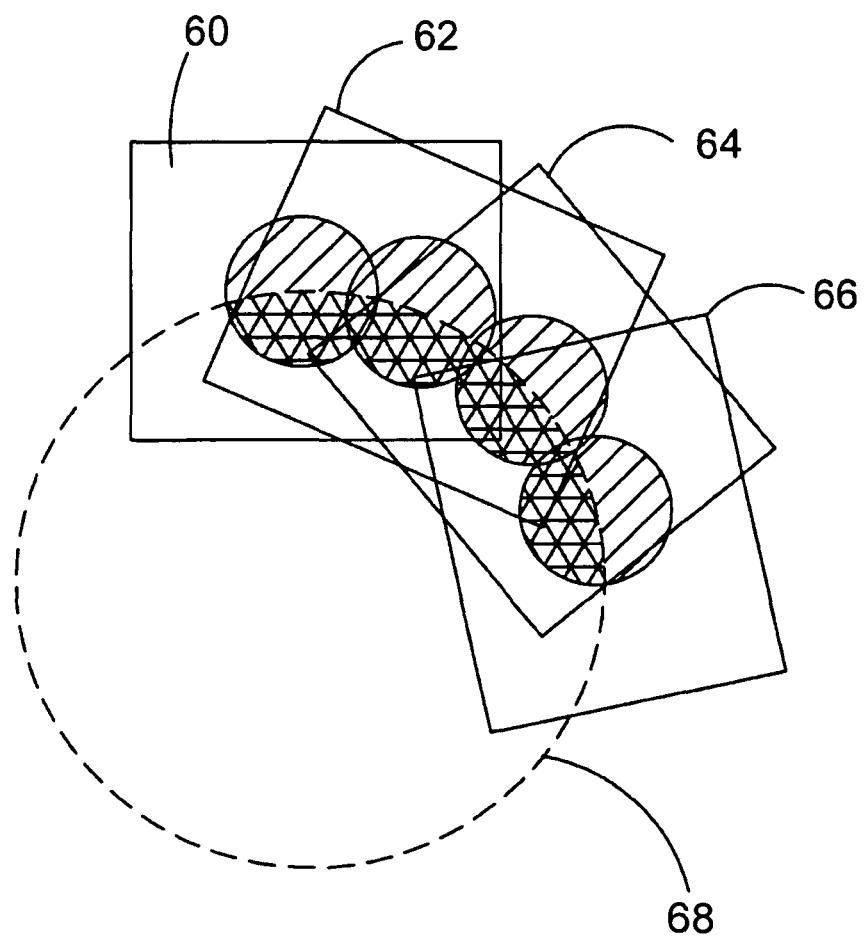

FIGS. 4a, b and c show optical arrangements of the camera probe illustrated in FIG. 1 which allow the focal point of the illumination system to be altered;

FIG. 5 shows an optical arrangement of the camera probe of FIG. 1 incorporating different aperture sizes;

FIGS. 6a and b show a light valve having concentric rings and a light valve having a pixel matrix respectively;

FIG. 7 shows an optical arrangement of the camera probe illustrated in FIG. 1, the camera probe having an aperture moveable along the length of the light path;

FIG. 8 shows an optical arrangement of the camera probe illustrated in FIG. 1, the camera probe having an aperture moveable across the width of the light path;

FIGS. 9a and b show further alternative optical arrangements of the camera probe illustrated in FIG. 1;

FIG. 10 is a cross sectional view through a part of a turbine blade including a bore, showing a light beam projected from the camera probe;

FIG. 11 illustrates the arrangement of FIG. 10 with the camera probe in alternative positions;

FIG. 12 illustrates the image on the detector of the camera probe, when the camera probe is positioned at position B' in FIG. 11;

FIG. 13 illustrates the image on the detector of the camera probe, when the camera probe is positioned at position B in FIG. 11;

FIG. 14 is a top view of the part of the turbine blade of FIG. 10, showing multiple positions of a projected light spot;

FIGS. 15A&15B illustrate the CMM and articulating probe head paths on measuring a narrow bore; and FIG. 16 illustrates data from multiple images arranged in a reference coordinate system.

FIG. 1 illustrates a coordinate measuring machine (CMM) 10 which comprises a table 12 onto which a part 16 can be mounted and a quill 14 which is movable relative to the table 12 in X, Y and Z. An articulating probe head 18 is mounted on the quill 16 and provides rotation about at least two axes A1,A2. A camera probe 20 is mounted onto the articulating probe head 18. The camera probe 20 can thus be moved in X,Y and Z by the CMM 10 and can be rotated about the A1 and A2 axes by the articulating probe head 18. Additional motion may be provided by the CMM or articulating probe head, for example the articulating probe head may provide rotation about the longitudinal axis of the camera probe A3.

Motors (not shown) are provided in the CMM 10 and articulating probe head 18 to drive the camera probe 20 to the desired position/orientation and these are controlled by a controller/computer 22/23 which sends drive signals to the CMM 10 and articulating probe head 18. The positions of the CMM 10 and articulating probe head 18 are determined by transducers (not shown) and the positions are fed back to the controller/computer 22/23.

Figure 2:
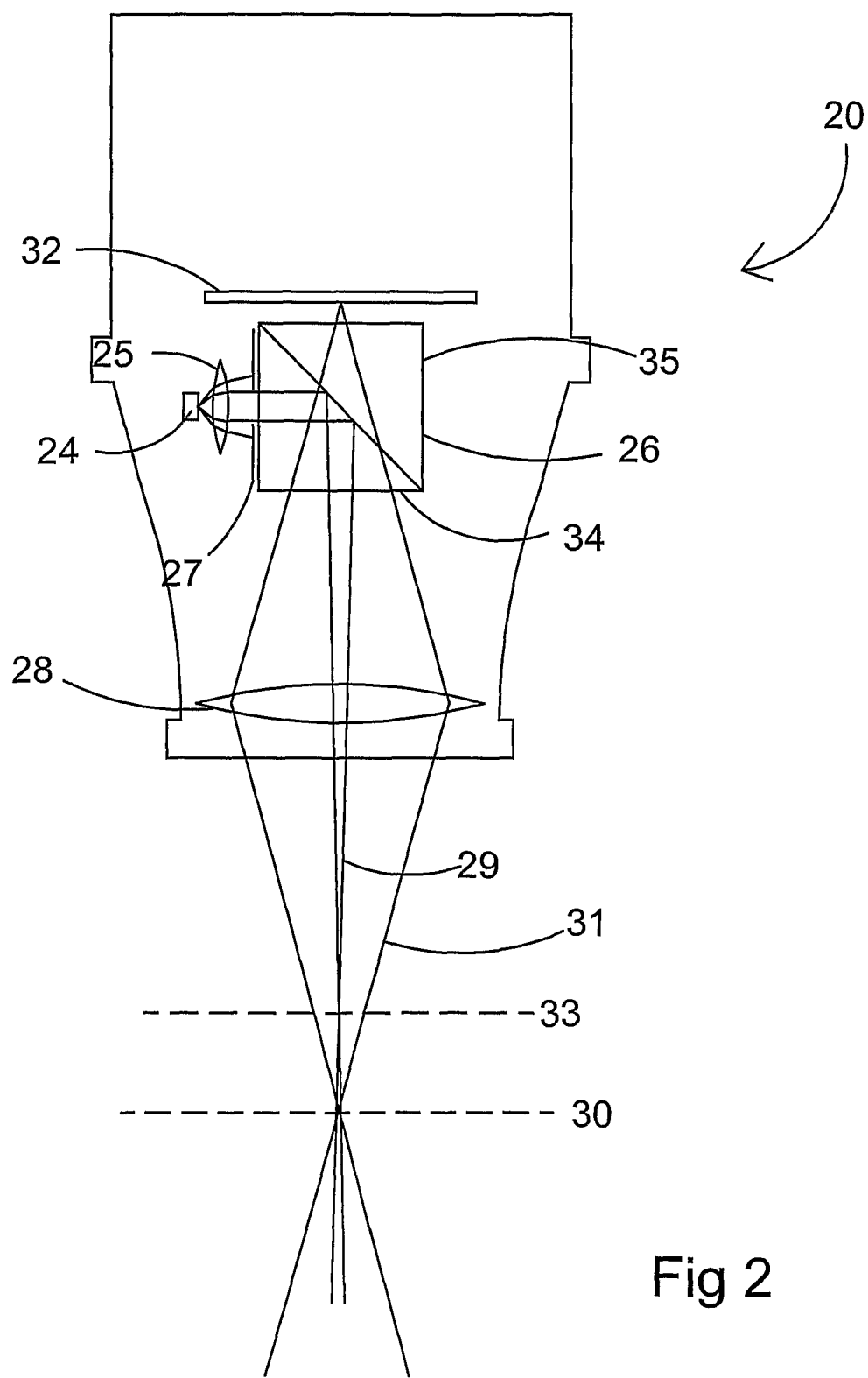
FIG. 2 illustrates a first optical arrangement the camera probe illustrated in FIG. 1.

The construction of the camera probe 20 is shown in more detail in FIG. 2.

FIG. 2 is a simplified diagram showing the internal layout of the camera probe 20. A light source 24, for example a light emitting diode (LED), produces a light beam 29 and directs it towards a first lens 25, an aperture 27 and on to a beam splitter 26. The beam splitter 26 reflects the beam towards a camera lens 28 which focuses the light at a first focal plane 33. The light continues on, now diverging, to the object plane 30 of the camera probe. Light reflected back from a surface at the object plane 30 passes through the camera lens 28 and beam splitter 26 and is detected by a detector 32, typically a charge-coupled device (CCD).

This layout is referred to as 'through the lens illumination' (TTLI). The arrangement of the focal plane of the illumination assembly in relation to the object plane of the detector has the advantage that the light can be directed down a narrow bore without illuminating the surface of the part into which the bore is formed. This has advantages for probes with both shallow and deep depths of field.

The arrangement is particularly advantageous where the probe has a shallow depth of field and the surface of the part into which the bore is formed is outside the depth of field and therefore out of focus. This can be where the depth of field is less than or approximately equal to the depth of the bore. In this case, if the light beam 29 was to fall on the surface into which the bore is formed it would be reflected much more effectively by said surface than by the side walls of the bore; this reflected light would appear as a bright, out-of-focus area on the sensor and would swamp the light returned to the camera probe 20 by the features of interest at the object plane 30, namely the side walls of the bore.

Where the probe has a deep depth of field both the surface into which the bore is formed and the side walls/bottom of the bore may be in focus. If this is the case, the image of the surface will tend to be much brighter than the image of the bore and therefore take up a greater proportion of the dynamic range of the detector. This can result in a lower quality image of the bore, and consequently in difficulties in distinguishing parts of the image of the inside of the bore. There is also the risk of the image of the bore being obscured by sensor artefacts such as blooming because the image of the front surface of the object is so much brighter.

In the embodiment shown in FIG. 2 the aperture 27 is of a fixed size; the size of the aperture can be chosen to limit the width of the beam illumination area at the object plane 30 to the diameter of the narrowest hole to be measured. In this way light reflections from the surface into which the bore is made can be avoided even when inspecting the narrowest bores.

A disadvantage of the layout shown in FIG. 2 is that some of the light from the light source 24 is reflected by a front face 34, and a side face 35, of the beam splitter 26 onto the detector 32, causing spurious bright spots on the detector, thus obscuring the image from the surface at the object plane 30.

Figure 3:
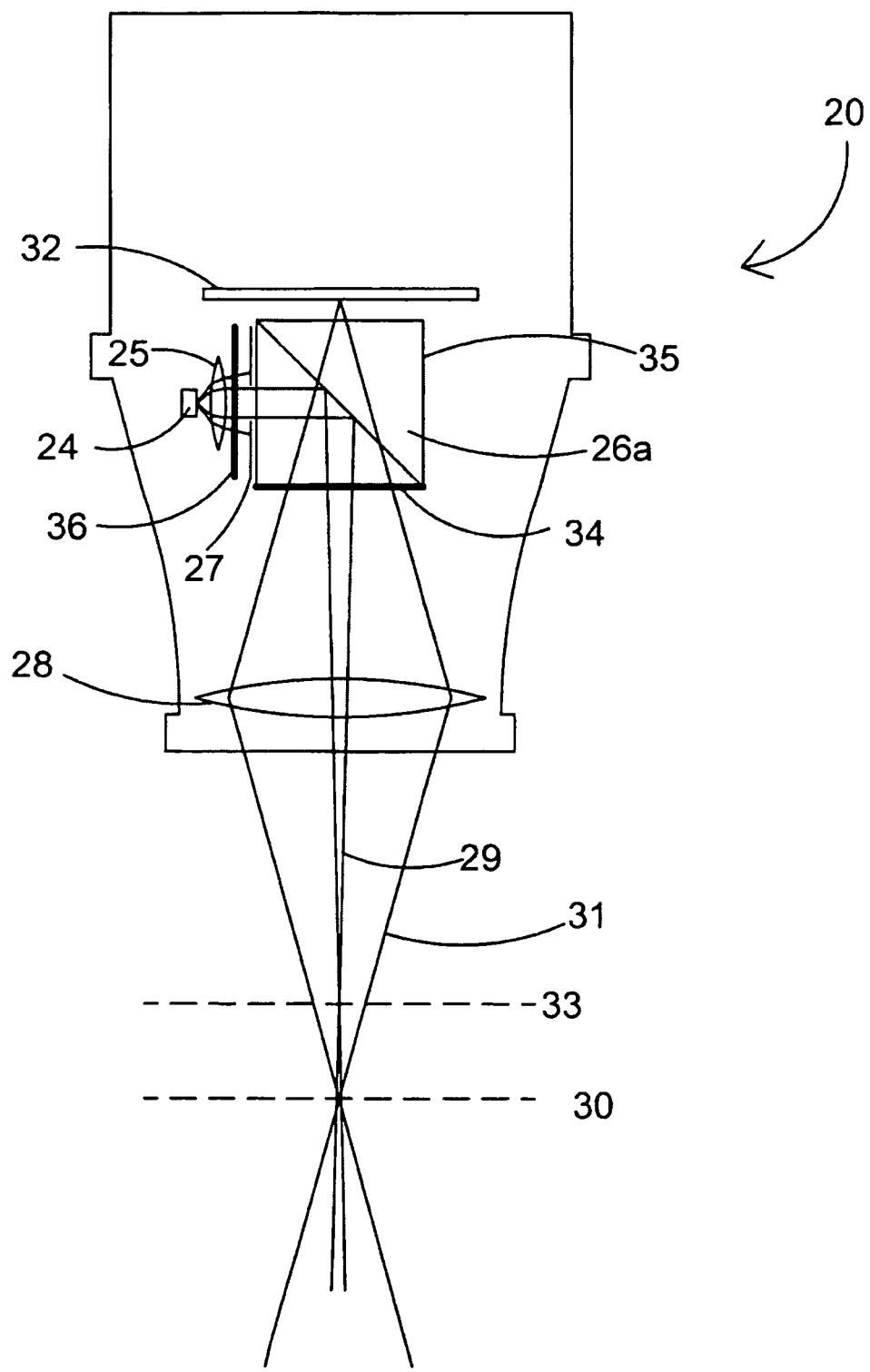
FIG. 3 illustrates a second optical arrangement of the camera probe illustrated in FIG. 1.

FIG. 3 illustrates an improved layout of the camera probe 20 which overcomes the problem of spurious bright spots on the detector. In the arrangement illustrated in FIG. 3, a polarising beam splitter 26a is used, and a polarising filter 36 is provided in front of the light source 24 to produce a polarised light beam. The polarised light is selectively reflected by the polarising beam splitter 26*a* towards the camera lens 28. None of the light passing through the polarising beam splitter 26*a* towards the camera lens 28 is reflected back toward the detector 32 by the front face 34 of the polarising beam splitter 26*a*. Nor does any light pass through the polarising beam splitter 26*a* to the side face 35, so reflections do not occur from this face either. The bright spot on the camera is thus reduced, compared to the apparatus shown in FIG. 2, or removed completely. The arrangement of FIG. 3 also has the advantage that only illumination scattered, and therefore randomly polarised, by the surface is returned to the camera; consequently specula reflections, which can cause measurement anomalies, are cut out.

The detector 32 is a two-dimensional pixelated detector; detectors other than CCDs can be used, for example complementary metal oxide semiconductor (CMOS) arrays. The position of each pixel in X and Y relative to a datum point, such as the detector centre, is known from calibration and thus the position of a detected image relative to the datum position can be determined.

The camera lens 28 is chosen to give the camera probe 20 a shallow depth of field, for example ±20 μm. If a surface is detected in focus, then its distance from the detector is known to within a range corresponding to the depth of field; therefore, a shallow depth of field means that the position of the surface in focus can be determined to within a small range. The position of a surface can therefore be more accurately determined the shallower the depth of field used.

The camera probe 20 of the present invention is particularly suitable for measuring narrow bores which cannot be measured by conventional means. One such application is narrow bores provided in turbine blades for air film cooling. These bores typically have a diameter of 300 μm to 2 mm and cannot be accessed by conventional means.

FIGS. 4*a*, *b* and *c* show optical arrangements of the camera probe illustrated in FIG. 1 which allow the focal point of the illumination system to be altered. Changing the focal point of the illumination system can result in a change in the area illuminated at the object plane by the illumination system.

FIG. 4*a* shows an optical arrangement having a movable light source. The light source 24 is moveable between a first position 24*a* and a second position 24*b*, along the path of the light beam 29.

In the first position 24*a* the first beam of light 29*a* is focussed to a first focal point 300*a* by the camera lens 28. The first focal point 300*a* lies on the first focal plane 33*a*, above the camera object plane 30. The first light beam 29*a* diverges from the first focal point 300*a* towards the camera object plane 30. When the first light beam 29*a* reaches the camera object plane 30 it illuminates a first area of diameter a.

In the second position 24*b* the second beam of light 29*b* is focussed to a second focal point 300*b* by the camera lens 28. The second focal point 300*b* lies on the second focal plane 33*b*, above the camera object plane 30. The second light beam 29*b* diverges from the second focal point 300*b* towards the camera object plane 30. When the second light beam 29*b* reaches the camera object plane 30 it illuminates a second area of diameter b.

The location of the focal points 300*a,b* is determined by the camera lens 28 characteristics and the distance between the light source 24*a,b* and the camera lens 28. The diameter a,b of the illumination area is determined by the divergence of the light beam 29*a* and the distance between the focal point 300*a,b* and the camera object plane 30.

By changing the distance between the light source 24 and the camera lens 28 the diameter a,b of the illumination area can therefore be adjusted so that it is suitable for illuminating inside bores of different diameters. In this embodiment, when the light source 24 is closer to the camera lens 28 the illumination area has a smaller diameter.

Figure 4B:
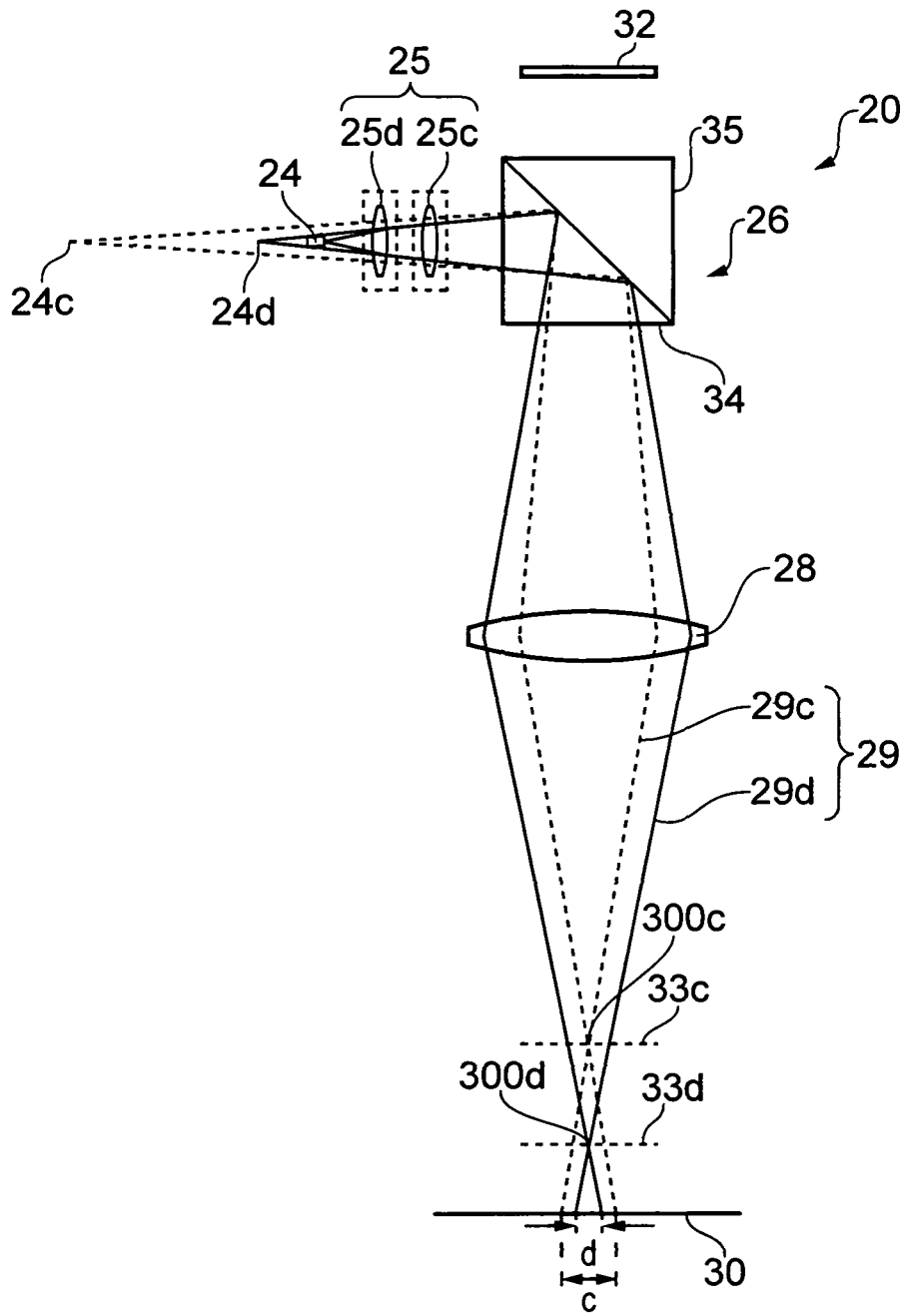

FIG. 4*b* shows an optical arrangement having an auxiliary lens 25 between the light source 24 and the camera lens 28. This auxiliary lens 25 can be moved along the path of the light beam 29 between a first position 25*c* and a second position 25*d*.

As in FIG. 4*b*, the camera lens 28 focuses the light beam 29*c,d* at a focal point 300*c,d* on focal plane 33*c, d* above the camera object plane 30, after which the light beam 29*c,d* diverges towards the camera object plane 30. When the light beam 29*c,d* reaches the camera object plane 30 it illuminates an area of diameter c,d.

The change in position of the auxiliary lens 25 results in a change in the divergence of the light beam 29, and hence a change in the apparent optical location 24*c,d* of the light source 24; both of these factors affect the diameter of the illumination area c,d. Therefore the size of the illumination area can be adjusted by moving the lens 25 along the path of the light beam; the apparatus can thus be adapted for use with bores of different diameters.

Figure 4C:
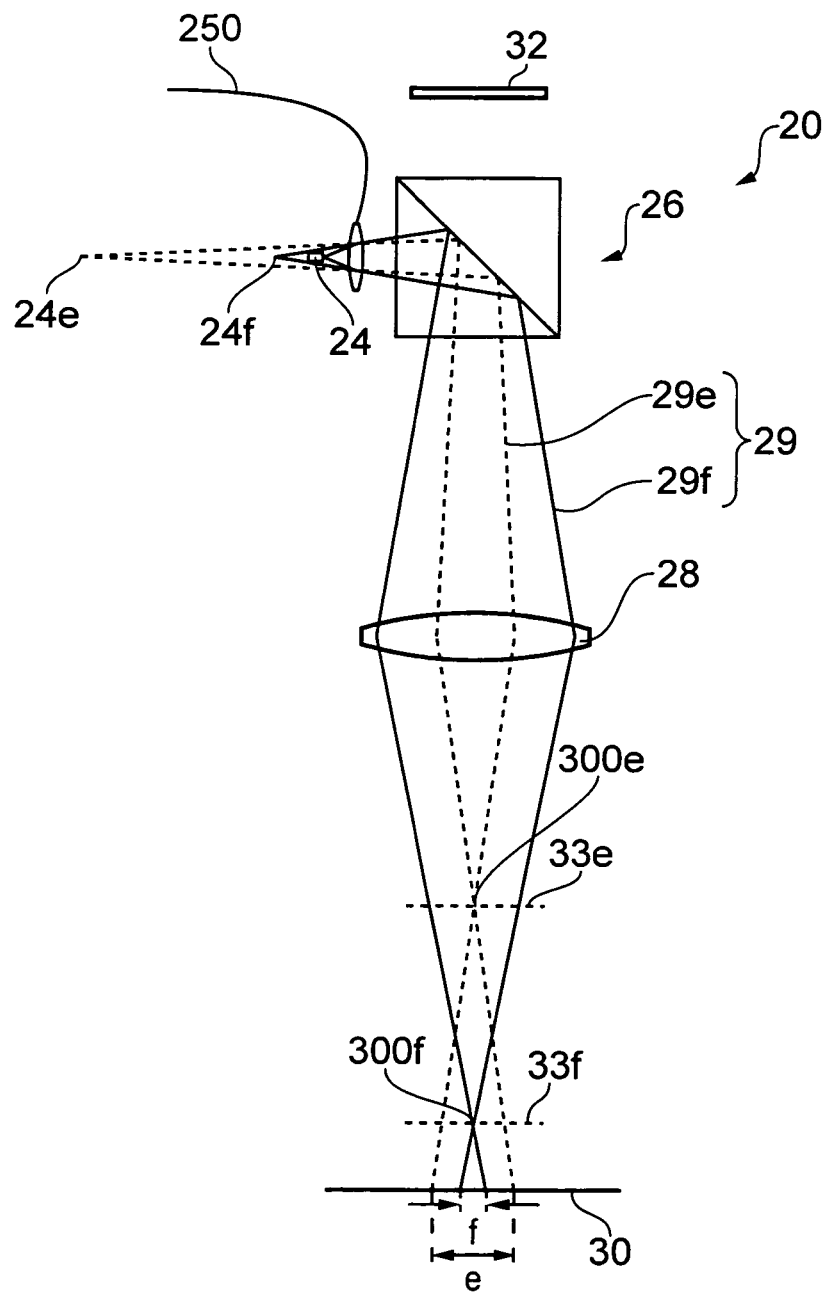

FIG. 4*c* shows an optical arrangement having an adaptive optical element 250 positioned in the path of the light beam 29. The adaptive optical element may be, for example, a liquid lens, liquid crystal lens, hydrostatic lens or deformable mirror.

A control signal is used to alter the optical properties of the adaptive optical element 250. This alters the apparent optical location 24*e,f* of the light source 24 by adjusting the light beam 29*e,f* divergence prior to the camera lens 28. The camera lens 28 focuses the light beam 29*e,f* at a focal point 300*e,f* on focal plane 33*e,f* above the camera object plane 30. When the light beam 29*e,f* reaches the camera object plane 30 it illuminates an area of diameter e,f. By changing the optical characteristics of the adaptive optic 250, rather than the location of a lens, there is less risk of the light beam 29 moving off the system optical axis (provided the system is well aligned initially).

FIG. 5 shows an optical arrangement of the camera probe of FIG. 1 incorporating different aperture sizes. The aperture 27 shown in FIG. 2 has a fixed size chosen to narrow the light beam at the object plane to a size suitable for the narrowest bores to be inspected; consequently larger diameter bores cannot be measured in a single image. Instead, to measure larger bores, the camera system must be moved to scan the light beam 29 around the bore, taking multiple images of the bore. These multiple images are then combined to form a composite image of the bore.

To overcome this problem, a number of aperture diameters, such as the iris aperture 270, may be provided in the apparatus such that the illumination area at the object plane 30 can be adjusted to suit different bore sizes.

FIG. 5 specifically shows a mechanically variable leaf iris aperture 270 mounted in the path of the light beam 29. The iris aperture 270 allows variability of the diameter of the light beam 29 diameter between minimum and maximum diameters. When the aperture 270 is set to its minimum diameter a first light beam 29*m* is able to pass through the aperture 270 and illuminates an area of diameter m at the object plane 30. When the aperture 270 is set to its maximum diameter a second light beam 29*n* is able to pass through the aperture 270 and illuminates an area of diameter n at the object plane 30. The diameter of the illumination area at the object plane can thus be adjusted by adjusting the diameter of the iris aperture 270. This arrangement is useful where the variety of diameters of bores to be inspected is great.

In the optical arrangement of FIG. 5 the focal point 300 of the light beam 29 lies at a fixed distance X above the object plane 30 of the imaging system. The distance X of the light beam focal plane 33 above the object plane 30 is at least half the depth of the deepest bore to be measured by the camera probe. If the distance X is less than this, the marginal rays of the light beam 29 may intersect the part surface into which the bore under inspection is formed; this can cause problems with the sensed image, as discussed previously.

If there are known to be only a limited number of bore diameters to inspect then the illumination area of the light beam 29 at the object plane 30 need only have a discrete number of diameters. This can be achieved by providing the apparatus with several apertures mounted on a moving assembly such as a carrousel or disc (not shown). An appropriately sized aperture can then be selected for each bore to be inspected by the camera probe.

In the event that a bore must be measured which does not match any of the fixed apertures on the carrousel, the aperture that is the nearest match without being too large would be selected. The camera would then have to be moved to scan the light beam in the same way as for the fixed aperture arrangement as shown in FIG. 2.

Another way to provide different sized apertures is by using a light valve such as transmissive and reflective liquid crystal arrays, liquid crystal on silicon arrays, micro electromechanical arrays (MEMS) or other light valve technologies. In a light valve the diameter of the TTLI beam can be varied electronically. The light valve may be placed between the light source and the camera lens as in the other variable aperture arrangements described herein. A control signal is used to modify the characteristics of the light valve, and hence the light beam.

FIGS. 6*a* shows a light valve 600 having a number of concentric rings 602, 604. The control signal is used to make some rings opaque 602. The number of opaque rings 602 controls the diameter of the light beam able to pass through the light valve 600.

Figure 6B:
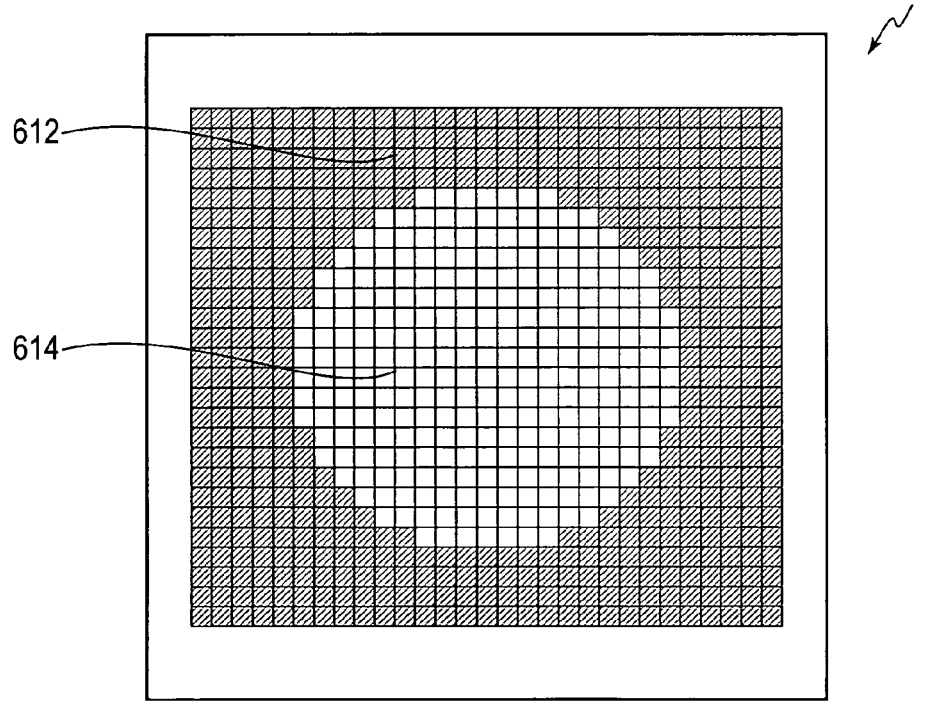

FIG. 6*b* shows an alternative light valve 610 having a matrix of pixels 612,614. Here, the control signal is used to make some pixels opaque 612. The number and position of the opaque pixels 612 controls the diameter and shape of the light beam able to pass through the light valve. The ability to vary the shape of the aperture as well as the size of the aperture offers the possibility of measuring some non-circular bores without the need to scan the light beam across the bore.

The pixels shown in the light valve 610 of FIG. 6*b* are square pixels. For circular, or near circular, bores there may be an advantage in using an array of hexagonal or triangular pixels, for example.

FIG. 7 shows an optical arrangement of the camera probe illustrated in FIG. 1, the camera probe having an aperture 271 moveable along the light path 29. A fixed diameter aperture 271 is placed in a region of the light beam 29 which is diverging or converging. Moving the aperture 271 from a first aperture position 271*g* to a second aperture position 271*h* along the length of the light beam 29 restricts the divergence of the light beam 29 (from a first light beam 29*g* to a second light beam 29*h*) as it passes through the camera lens 28. This in turn controls the diameter of the illumination area of the light beam at the camera object plane 30, restricting the illuminated area from a first diameter g to a second diameter h while ensuring that the focal point 300*g* on the focal plane 33*g* of the first light beam 29*g* is the same as the focal point 300*h* on the focal plane 33*h* of the second light beam 29*h*. It is therefore possible to achieve variability (between a maximum and minimum) in the diameter of the illumination area of the light beam 29 at the object plane.

FIG. 8 shows an optical arrangement of the camera probe illustrated in FIG. 1, the camera probe having an optical element, such as an aperture, 272 in the path of the light beam 29. The aperture 272 is moved (tilted or translated) rapidly through the light beam 29 and the light beam 29 either reflects off, or passes through the aperture 272. Where the light beam passes through the aperture 272 it continues along the optical path to the beam splitter 26 and is reflected by the beamsplitter 26, through the camera lens 28 towards the object plane 30.

In a first aperture position 272*j* a light beam 29*j* passes through the aperture 272 and illuminates and area j at the object plane. The aperture is rapidly moved to a second aperture position 272*k*; here a light beam 272*k* passes through the aperture 272 and illuminates and area k at the object plane. As the aperture 272 is moved rapidly through the light beam the area of illumination at the object plane moves or scans across the object plane 30 such that the entire bore will receive some illumination during the integration time of the camera probe.

The scanning motion could follow the anticipated shape of the bore. Alternatively a raster scan may be carried out along a fixed path; such a path may be, for example, a rectangular or spiral sweep. In the case of the raster scan, the light source might only be switched on when the beam is in a position to illuminate the side wall of the bore (or where it is likely that the side wall of the bore will be illuminated).

The design of the scanning element and other optics in the light beam 29 is such that the focal point 300*j,k* of the light beam 29*j,k* does not move as the beam moves. Consequently the beam 29*j,k* appears to pivot about the focal point 300*j,k*, thus minimising the possibility of inadvertently illuminating the surface into which the bore is made.

It will be understood that the focal point 300*g,h* may alternatively move during the scanning process.

FIGS. 9*a* and *b* show further alternative optical arrangements of the camera probe illustrated in FIG. 1. It will be understood that lens assemblies of cameras, and as such a camera probe, can comprise a number of lenses. Additionally, camera lenses can comprise other optical elements. It will also be understood that there are many ways to arrange the optical elements in a camera, and camera probe, to enable a light source to illuminate an area and an image to be obtained of that area. The embodiments described in this application are given as examples of such arrangements.

In the arrangement of FIG. 9*a* an illumination assembly 240, together with its optical elements (not shown), is provided in front of a camera lens assembly 280. The camera lens assembly 280 comprises two lenses, a first lens 280*a* and a second lens 280*b*. The camera probe is arranged such that it can capture images of a surface at an object plane 30 or within the field of view of the camera probe.

The illumination assembly 240 comprises a light source (not shown) which produces a light beam 290, the optical elements (not shown) within the illumination assembly focus the light beam 290 at a focal point 300*x* at a first focal plane 330. The light continues on, now diverging, towards the object plane 30 of the camera probe. Light reflected back from a surface at the object plane 30 passes through the first lens 280*a* and second lens 280*b* and is detected by a detector sensor 32.

In the embodiment of FIG. 9a the arrangement of the illumination assembly relative to the camera lens assembly may result in some light reflected from a surface not being able to reach the detector sensor 32; however, this does not necessarily compromise the quality of the image obtained. This particular arrangement does place limits on the width of the illumination assembly and therefore the diameter of the light beam as it exits the illumination assembly; the wider the illumination assembly the greater the obscuration of the image sensed by the detector sensor 32.

Figure 9B:
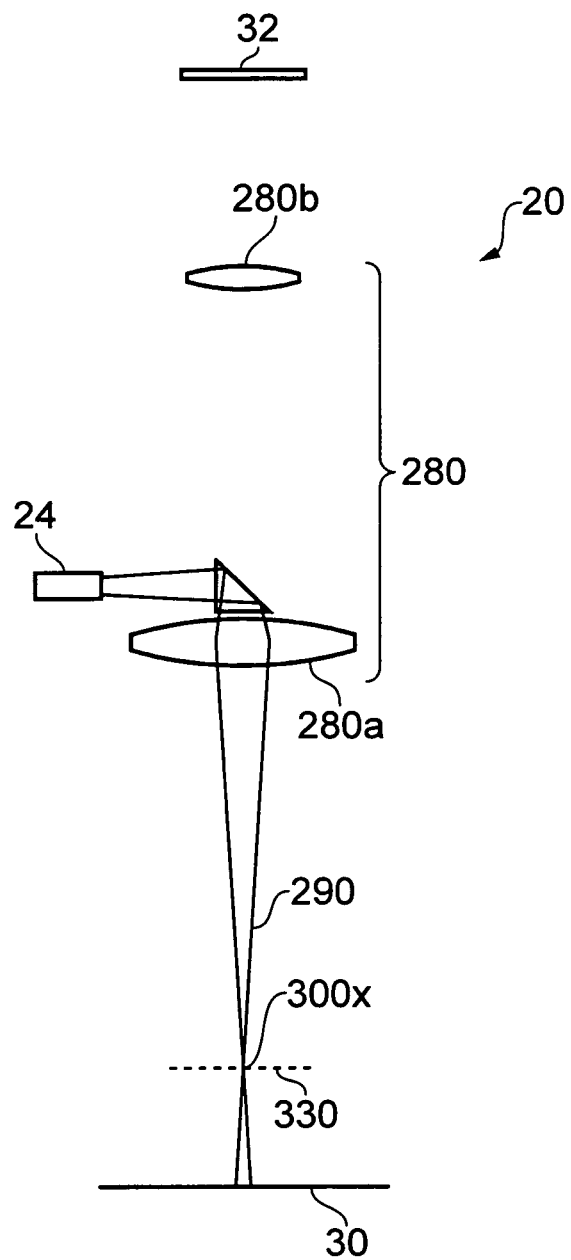

FIG. 9b shows a further possible optical arrangement of the camera probe. Here, the light source 24 is provided out of the imaging path of the camera probe. A beam splitter 26 is provided in the lens assembly to direct light beam 290 from the light source to the object plane 30. It is possible that, with careful arrangement, the beam splitter will not obscure the imaging path of the camera probe. It will be understood that a turning mirror, for example, could be used in place of a beam splitter.

One suitable method of measuring a narrow bores will now be described with reference to FIGS. 10-15.

In a first step the camera probe is positioned by the CMM or articulating probe head or a combination of the two so that the light spot is incident on a surface of the feature of interest. FIG. 10 illustrates a cross section of part of a turbine blade 38 which includes a narrow bore 40. The narrow bore 40 is profiled with its largest diameter at the top 42 and bottom 44 surfaces and the diameter reducing to a central throat or metering section 46 of minimum diameter.

To measure the metering section 46, the camera probe is positioned to project the light spot onto the surface of the metering section. There are several considerations in selecting the position and orientation of the camera probe. The line of sight must be maintained, to enable projection of light spot and detection of image. The light path is preferably positioned as normal to the plane of interest as possible as this keeps a larger region of the surface in focus and provides for the maximum level of illumination being returned to the camera. This is an important consideration due to the shallow depth of field.

The position and orientation of the camera probe is also chosen to position the light spot at an edge of the feature of interest in silhouette. By doing this a sharp line is created between the edge (bright) and the hole (dark), thereby simplifying image processing. However, by choosing a path which puts an edge in silhouette, it may not be possible to keep the light path normal to the plane of interest. Another important consideration on the position and orientation of the probe is to ensure that the TTLI does not clip the surface into which the bore is formed. Focussing the TTLI above the focal plane of the camera provides for the diameter of the TTLI to be at its minimum where the bore breaks through the surface. The optimum distance between the TTLI focal plane and camera focal plane can be determined from the minimum bore size and maximum length to diameter ratio of the bores to be inspected.

In the arrangement of FIG. 10, the requirements of line of sight and putting the edge of the metering section in silhouette results in the light path being located away from its optimum position along the surface normal.

FIG. 10 shows the camera probe positioned at position A. In this position, there is line of sight and an edge of the metering section is put in silhouette. However the light path is almost perpendicular to the surface normal, giving very low returned illumination and making the area of surface in the focal plane very small.

FIG. 11 shows the camera probe positioned at position B. In this position, there is line of sight and the light path is closer to the surface normal. However, the edge of the metering section is not in silhouette which makes image processing difficult. In position B', the camera probe has been moved down to measure the bottom edge of the metering section. This time there is line of sight, the edge is in silhouette and the light path is closer to the surface normal.

FIG. 12 illustrates the image 48 received on the detector when the camera probe is at position B'. The image shows a crescent shaped bright area 50 corresponding to light reflected from the metering section surface and a dark segment 52 where the light passed through the hole. A clear boundary 53 can be seen between light and dark, corresponding to the edge.

FIG. 13 illustrates the image 54 received on the detector when the camera probe was located at position B. As the edge was not put in silhouette, the parts of the image 56,58 corresponding to the different surfaces are not clearly differentiated and the boundary between them 60 is not so well defined.

The camera probe is moved to take a series of images covering the extent of the feature.

FIG. 14 illustrates the top surface of the turbine blade 38 illustrated in FIG. 10, showing the neck 42 and metering section 46 of the narrow bore 40. A magnified region 50 of the metering section shows a series of light spots 48 incident on the edge of the metering section. Each light spot puts the edge in silhouette.

The camera probe may be moved to each new position by moving the CMM, articulating probe head or both.

Combining the motion of the CMM with that of the probe head has the advantage of creating more control over the angle of the camera probe, required to create a silhouette. Typically, the camera probe may be positioned to take each image by moving the CMM to put the edge of interest in silhouette and then rotating the articulating probe head to position the light spot radially from the centre line of the bore 55. For example the CMM may move in a circular path whilst the articulating probe head rotates about its A1 axis.

The path which the CMM/articulating probe head follow may be a known path derived from a CAD model.

FIGS. 15A and 15B illustrate the CMM quill 14 moving in a circular path 56 about the centre line 59 of the bore and the articulating probe head 18 rotating about the A1 axis to position a light beam 58 emitting from the camera probe 20 in the desired direction.

Ideally, the images are taken so that there is an overlap between the detected light spots, which makes image processing easier.

As the camera probe is rotated during the method, images are taken around a feature such as a bore, the images are at different angles in the XY plane. This is due to the motion of the articulating probe head.

As mentioned previously, the XY positions of the pixels are known due to calibration of the camera probe. The reflected spot is known to be nominally along the optical axis of the probe. The position of the camera probe is known in space due to the CMM and articulating probe head coordinates. Therefore, the X,Y,Z position in the CMM reference frame of each pixel can be determined. Each image can thus be stitched together, by determining the coordinates of each pixel for each image.

The unprocessed images are stitched together to create a resultant image. Where the spots overlap, continuously stitched images can be created and an algorithm can be used to stitch the whole region of interest. Where the light spots do not overlap, the image can only be created where there was spot illumination and therefore an incomplete picture is created.

FIG. 16 shows a set of images 60-66 taken in the XY plane which arranged in a reference coordinate system. The images are overlapping, and angled one relative to another.

The camera probe or the feature may be angled relative to one another so that the images are not in the XY plane. In this case, the same technique may be used, by creating a map of vocsels (3D pixels). Each vocsels has an X,Y coordinate derived from the known pixel position and a Z coordinate, known from the position and orientation of the focal plane with respect to the probe head. The error range in the Z coordinate will be larger than the error range in the X,Y coordinates, making the vocsels rectangular.

The discrete images are stitched together to form a resultant image. Where there is overlap between images, the intensities may be summed (for example by first assigning a number value for intensity). This results in the bright areas becoming brighter and the dark areas becoming darker, therefore improving the contrast.

Once the images have been stitched together to create a resultant image known image processing techniques are used to detect points on the feature of interest (e.g. an image analysis technique is used to determine the boundary between the bright and dark areas). For example by means of a "matching squares" algorithm. An intensity threshold value may be used to determine the boundary. Once the boundary has been determined, the parameters of the feature may be determined by treating the boundary as data points in 3D space. In FIG. 16 the boundary 68 between the regions of high and low intensity is shown.

The invention claimed is:

1. A camera inspection probe for a coordinate measuring apparatus including a housing having an exterior window, the housing comprising:
    an imaging assembly of the camera inspection probe that is configured to capture an image of an object at an object plane of the imaging assembly; and
    an illumination assembly of the camera inspection probe that is configured to produce a light beam directed toward the object to illuminate the object, the light beam being directed toward the object plane,
    wherein the light beam converges to a focal point at a first focal plane outside the housing, the focal point being between the exterior window and the object plane so as to be prior to intersection of the light beam with the object plane, and
    wherein the imaging assembly is configured to obtain a focused image of a region of the object from reflected light of the light beam produced by the illumination assembly, at a point subsequent to the focal point of the light beam.

2. The camera inspection probe according to claim 1, wherein the focal point of the light beam is substantially coincident with the camera inspection probe's imaging optical axis.

3. The camera inspection probe according to claim 1, wherein the light beam is directed from the camera inspection probe to the first focal plane along an illumination optical axis, the illumination optical axis being substantially coincident with the camera inspection probe's imaging optical axis.

4. The camera inspection probe according to claim 1, wherein the location of the focal point of the light beam is adjustable relative to the camera inspection probe.

5. The camera inspection probe according to claim 4, wherein the illumination assembly comprises a moveable light source such that the location of the focal point of the light beam is adjustable relative to the camera inspection probe.

6. The camera inspection probe according to claim 4, further comprising at least one lens in the path of the light beam, the at least one lens being moveable along the path of the light beam such that the location of the focal point of the light beam is adjustable relative to the camera inspection probe.

7. The camera inspection probe according to claim 4, further comprising an adaptive optical element positioned in the path of the light beam, the optical properties of the adaptive optical element being alterable so as to change the location of the focal point of the light beam relative to the camera inspection probe.

8. The camera inspection probe according to claim 4, wherein the focal point, at its adjusted positions, remains substantially coincident with the camera inspection probe's imaging optical axis.

9. The camera inspection probe according to claim 1, configured such that the light beam diverges from its focal point, the divergence of the light beam being selectively adjustable.

10. The camera inspection probe according to claim 1, configured such that the light beam diverges from its focal point to illuminate an illumination area at the object plane of the imaging assembly, the position of the illumination area being selectively adjustable.

11. The camera inspection probe according to claim 1, wherein the illumination assembly is provided with at least one optical element configured to control the size of the light beam.

12. The camera inspection probe according to claim 11, wherein the illumination assembly is provided with at least one optical element configured to provide a variety of beam sizes.

13. The camera inspection probe according to claim 12, wherein the at least one optical element is a variable size optical element.

14. The camera inspection probe according to claim 12, wherein the at least one optical element is a variable shape optical element.

15. The camera inspection probe according to claim 12, wherein at least two interchangeable optical elements are provided.

16. The camera inspection probe according to claim 11, wherein the at least one optical element is moveable.

17. The camera inspection probe according to claim 16, wherein the at least one optical element is moveable along the length of the light beam.

18. The camera inspection probe according to claim 16, wherein the at least one optical element is moveable within the light beam.

19. The camera inspection probe according to claim 11, wherein the at least one optical element is an aperture.

20. The camera inspection probe according to claim 1, wherein the camera inspection probe is a vision probe.

21. The camera inspection probe according to claim 1,
    wherein the imaging assembly comprises an objective lens and the object plane, and
    wherein the imaging assembly has a depth of field of not more than $1/100$th of the distance between the objective lens and the object plane.

22. The camera inspection probe according to claim 1, wherein the imaging assembly has a depth of field of not more than 3 mm.

23. The camera inspection probe according to claim 1, wherein the camera inspection probe is a video inspection probe.

24. A method of inspecting a feature of an object, the method comprising:
- taking a camera inspection probe mounted on a coordinate measuring apparatus, the camera inspection probe including a housing having an exterior window, the housing comprising:
  - (1) an imaging assembly of the camera inspection probe that is configured to capture an image of the feature to be inspected, and
  - (2) an illumination assembly of the camera inspection probe that is configured to produce a light beam directed toward the feature so as to illuminate the feature of the object, the light beam being directed toward an object plane of the imaging assembly, and the light beam converging at a focal point at a first focal plane between the exterior window and the object plane so as to be prior to intersection of the light beam with the object plane;
- arranging the focal point of the light beam such that the light beam converges at its focal point prior to falling on the feature; and
- obtaining by the imaging assembly at least one focused image of a region of the feature from reflected light of the light beam produced by the illumination assembly, at a point subsequent to the focal point of the light beam.

25. The method according to claim 24, wherein the feature is an opening in the object.

26. The method according to claim 25, wherein the method further comprises arranges the focal point of the light beam substantially at or prior to a mouth of the opening.

27. The method according to claim 24, wherein the feature is a bore of a turbine blade.

28. The method according to claim 24, wherein the camera inspection probe is a video inspection probe.

29. A camera inspection probe for a coordinate measuring apparatus including a housing having an exterior window, the housing comprising:
- an imaging assembly of the camera inspection probe that is configured to capture an image of an object at an object plane of the imaging assembly; and
- an illumination assembly of the camera inspection probe that is configured to produce a light beam directed toward the object to illuminate the object, the light beam being directed toward the object plane,
- wherein the light beam converges to a focal point at a first focal plane outside the housing, the focal point being between the exterior window and the object plane so as to be prior to intersection of the light beam with the object plane,
- wherein the imaging assembly is configured to obtain a focused image of a region of the object from reflected light of the light beam produced by the illumination assembly, at a point subsequent to the focal point of the light beam, and
- wherein (i) the imaging assembly has a depth of field of not more than $1/100$th of the distance between an objective lens of the imaging assembly and the object plane or (ii) the imaging assembly has a depth of field of not more than 5 mm.

30. The camera inspection probe according to claim 29, wherein the imaging assembly has a depth of field of not more than $1/100$th of the distance between the objective lens of the imaging assembly and the object plane.

31. The camera inspection probe according to claim 29, wherein the imaging assembly has a depth of field of not more than 5 mm.

32. A method of inspecting an opening of an object, the method comprising:
- taking a camera inspection probe mounted on a coordinate measuring apparatus, the camera inspection probe including a housing having an exterior window, the housing comprising:
  - (1) an imaging assembly of the camera inspection probe that is configured to capture an image of the opening to be inspected, and
  - (2) an illumination assembly of the camera inspection probe that is configured to produce a light beam directed toward the opening so as to illuminate the opening of the object, the light beam being directed toward an object plane of the imaging assembly, and the light beam converging at a focal point at a first focal plane between the exterior window and the object plane so as to be prior to intersection of the light beam with the object plane;
- arranging the focal point of the light beam such that the light beam converges at its focal point prior to falling on the opening and such that the focal point is substantially at a mouth of the opening; and
- obtaining by the imaging assembly at least one focused image of a region of the opening from reflected light of the light of the light beam produced by the illumination assembly, at a point subsequent to the focal point of the light beam.

33. The method according to claim 32, wherein the focal point of the light beam is arranged so that, at the mouth of the opening, the width of the light beam is less than that of the mouth.

* * * * *